(12) United States Patent
Guo et al.

(10) Patent No.: US 12,607,895 B2
(45) Date of Patent: Apr. 21, 2026

(54) ELECTRONIC DEVICE HAVING AT LEAST ONE CHOLESTERIC LIQUID CRYSTAL LAYER

(71) Applicant: InnoLux Corporation, Miao-Li County (TW)

(72) Inventors: Ming-Chi Guo, Miao-Li County (TW); Hsing-Yuan Hsu, Miao-Li County (TW); Po-Yang Chen, Miao-Li County (TW); I-An Yao, Miao-Li County (TW)

(73) Assignee: INNOLUX CORPORATION, Chu-Nan (TW)

(*) Notice: Subject to any disclaimer, the term of this patent is extended or adjusted under 35 U.S.C. 154(b) by 0 days.

(21) Appl. No.: 18/911,591

(22) Filed: Oct. 10, 2024

(65) Prior Publication Data

US 2025/0155765 A1     May 15, 2025

Related U.S. Application Data

(60) Provisional application No. 63/598,276, filed on Nov. 13, 2023.

(30) Foreign Application Priority Data

Jun. 26, 2024    (CN) .......................... 202410837302.8

(51) Int. Cl.
G02F 1/137     (2006.01)
G02F 1/1343    (2006.01)
G09G 3/36      (2006.01)

(52) U.S. Cl.
CPC .... G02F 1/13718 (2013.01); G02F 1/134363 (2013.01); G09G 3/3607 (2013.01);
(Continued)

(58) Field of Classification Search
CPC .......... G02F 1/13718; G02F 1/134363; G09G 3/3607; G09G 3/3651; G09G 3/3677; G09G 3/3688
See application file for complete search history.

(56) References Cited

U.S. PATENT DOCUMENTS

2002/0039088 A1*   4/2002   Schlangen ........... G09G 3/3629
                                                          345/87
2013/0050598 A1*   2/2013   Uehara ............... G02F 1/13306
                                                          349/33

FOREIGN PATENT DOCUMENTS

CN        103365010 A       10/2013
TW        201314650 A       4/2013

* cited by examiner

*Primary Examiner* — Lunyi Lao
(74) *Attorney, Agent, or Firm* — Muncy, Geissler, Olds & Lowe, P.C.

(57)     ABSTRACT

A display device is provided with a first panel including multiple first electrodes and multiple second electrodes intersecting with each other to define multiple pixels, and a cholesteric liquid crystal layer disposed between the first electrodes and the second electrodes. The pixels each operate through multiple phases, including the preparation phase, selection phase and evolution phase, each of which includes a high wave phase and a low wave phase. When one of the pixels operates in the low wave phase of the selection phase, one of the first electrodes corresponding the one of the pixels is applied with a first voltage waveform, one of the second electrodes corresponding to the one of the multiple pixels is applied with a second voltage waveform, and the cholesteric liquid crystal layer corresponding to the one of the multiple pixels receives a first voltage difference, which is not equal to zero.

19 Claims, 12 Drawing Sheets

(52) U.S. Cl.
     CPC ......... *G09G 3/3651* (2013.01); *G09G 3/3677*
                   (2013.01); *G09G 3/3688* (2013.01); *G09G*
                                        *2320/0626* (2013.01)

FIG. 8A

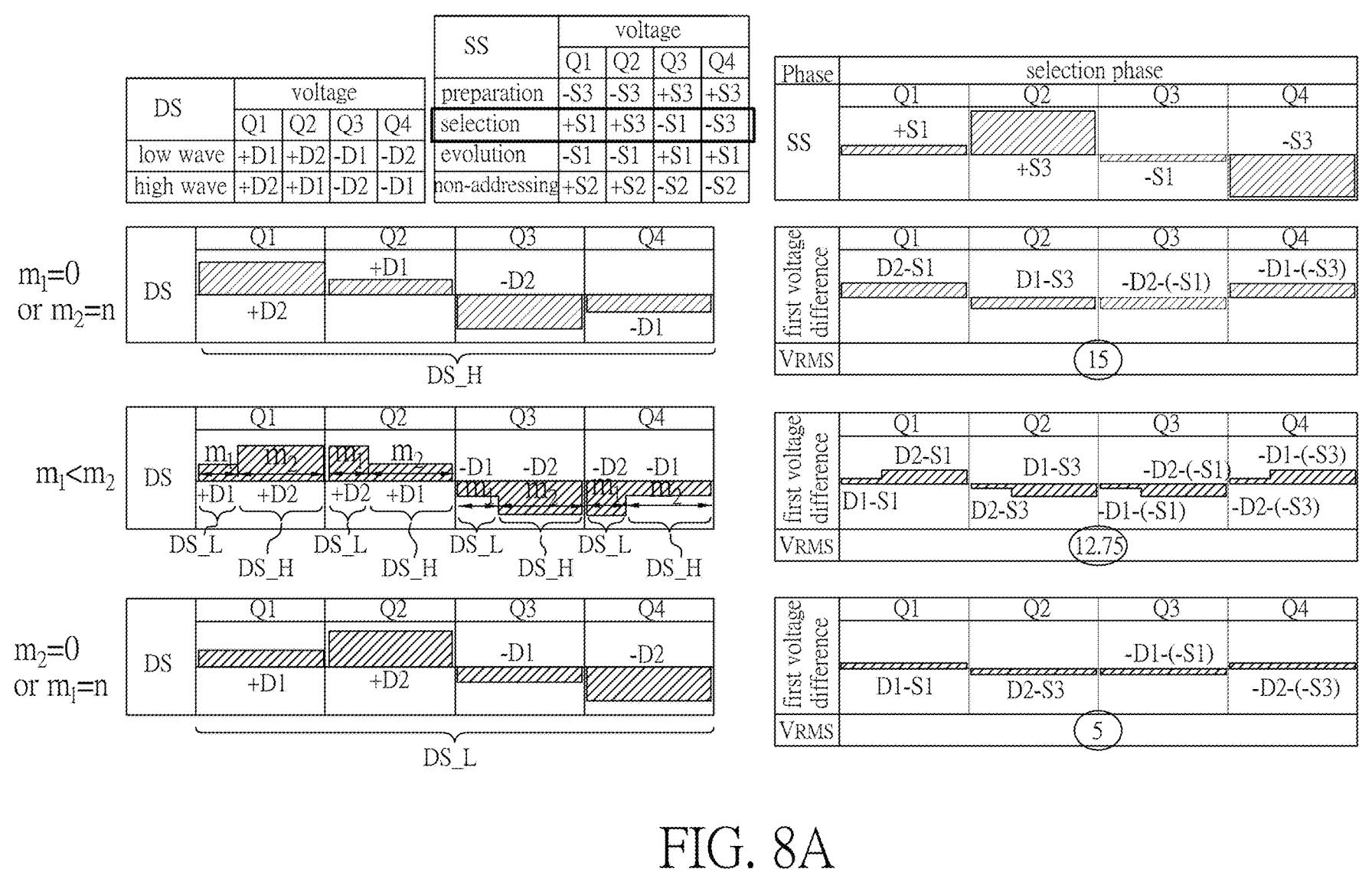

| Phase | | selection phase | | | |
|---|---|---|---|---|---|
| | | Q1 | Q2 | Q3 | Q4 |
| SS | | +S1 | +S3 | −S1 | −S3 |

| | | Q1 | Q2 | Q3 | Q4 |
|---|---|---|---|---|---|
| first voltage difference | | D2−S1 | D1−S3 | −D2−(−S1) | −D1−(−S3) |
| VRMS | | | | | 15 |

| | | Q1 | Q2 | Q3 | Q4 |
|---|---|---|---|---|---|
| first voltage difference | | D2−S1 / D1−S1 | D1−S3 / D2−S3 | −D2−(−S1) / −D1−(−S1) | −D1−(−S3) / −D2−(−S3) |
| VRMS | | | | | 12.75 |

| | | Q1 | Q2 | Q3 | Q4 |
|---|---|---|---|---|---|
| first voltage difference | | D1−S1 | D2−S3 | −D1−(−S1) | −D2−(−S3) |
| VRMS | | | | | 5 |

| SS | | Q1 | Q2 | Q3 | Q4 |
|---|---|---|---|---|---|
| | voltage | | | | |
| preparation | | −S3 | −S3 | +S3 | +S3 |
| selection | | +S1 | +S3 | −S1 | −S3 |
| evolution | | −S1 | −S1 | +S1 | +S1 |
| non-addressing | | +S2 | +S2 | −S2 | −S2 |

| DS | | Q1 | Q2 | Q3 | Q4 |
|---|---|---|---|---|---|
| | voltage | | | | |
| low wave | | +D1 | +D2 | −D1 | −D2 |
| high wave | | +D2 | +D1 | −D2 | −D1 |

| DS | | Q1 | Q2 | Q3 | Q4 |
|---|---|---|---|---|---|
| (m₁=0 or m₂=n) | | +D2 | +D1 | −D2 | −D1 |

DS_H

| DS | | Q1 | Q2 | Q3 | Q4 |
|---|---|---|---|---|---|
| (m₁<m₂) | | +D1 ... +D2 | +D2 ... +D1 | −D1 ... −D2 | −D2 ... −D1 |

DS_L ... DS_H ... DS_L ... DS_H ... DS_L ... DS_H ... DS_L ... DS_H ... DS_L ... DS_H m₁   m₂

| DS | | Q1 | Q2 | Q3 | Q4 |
|---|---|---|---|---|---|
| (m₂=0 or m₁=n) | | +D1 | +D2 | −D1 | −D2 |

Figure 8D:
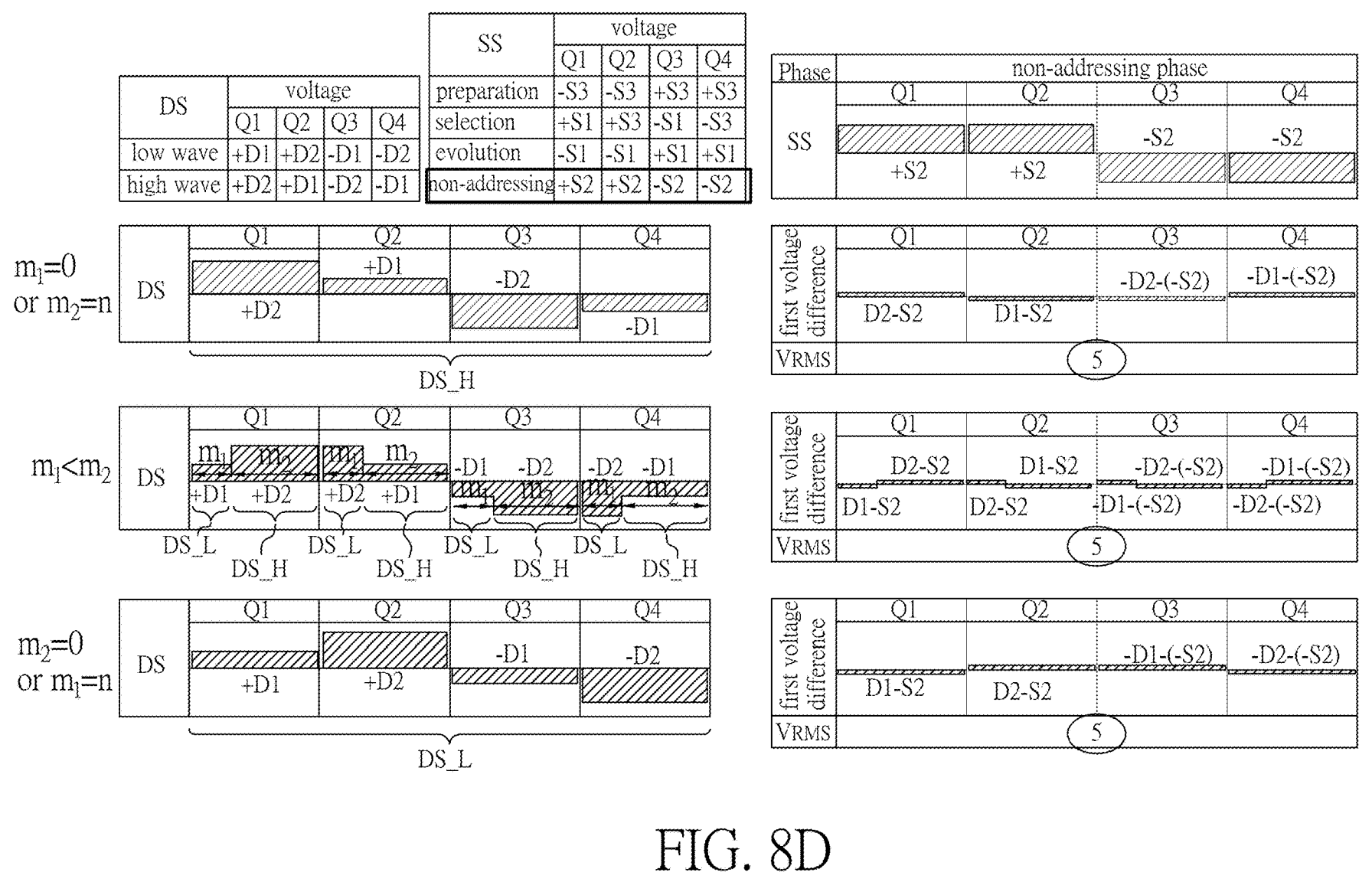

| Phase | | Q1 | Q2 | Q3 | Q4 |
|---|---|---|---|---|---|
| SS | | +S2 | +S2 | -S2 | -S2 | non-addressing phase

| | | Q1 | Q2 | Q3 | Q4 |
|---|---|---|---|---|---|
| first voltage difference | | D2-S2 | D1-S2 | -D2-(-S2) | -D1-(-S2) |
| VRMS | | | ⑤ | | |

| | | Q1 | Q2 | Q3 | Q4 |
|---|---|---|---|---|---|
| first voltage difference | | D1-S2 / D2-S2 | D2-S2 / D1-S2 | -D2-(-S2) / -D1-(-S2) | -D1-(-S2) / -D2-(-S2) |
| VRMS | | | ⑤ | | |

| | | Q1 | Q2 | Q3 | Q4 |
|---|---|---|---|---|---|
| first voltage difference | | D1-S2 | D2-S2 | -D1-(-S2) | -D2-(-S2) |
| VRMS | | | ⑤ | | |

| SS | | voltage | | | |
|---|---|---|---|---|---|
| | | Q1 | Q2 | Q3 | Q4 |
| | preparation | -S3 | -S3 | +S3 | +S3 |
| | selection | +S1 | +S3 | -S1 | -S3 |
| | evolution | -S1 | -S1 | +S1 | +S1 |
| | non-addressing | +S2 | +S2 | -S2 | -S2 |

| DS | | voltage | | | |
|---|---|---|---|---|---|
| | | Q1 | Q2 | Q3 | Q4 |
| | low wave | +D1 | +D2 | -D1 | -D2 |
| | high wave | +D2 | +D1 | -D2 | -D1 |

| DS | | Q1 | Q2 | Q3 | Q4 |
|---|---|---|---|---|---|
| | | +D2 | +D1 | -D2 | -D1 |

DS_H $m_1=0$ or $m_2=n$

| DS | | Q1 | Q2 | Q3 | Q4 |
|---|---|---|---|---|---|
| | | +D1 / +D2 | +D2 / +D1 | -D1 / -D2 | -D2 / -D1 |

$m_1 < m_2$

DS_L  DS_H  DS_L  DS_H  DS_L  DS_H  DS_L  DS_H $m_1$  $m_2$

| DS | | Q1 | Q2 | Q3 | Q4 |
|---|---|---|---|---|---|
| | | +D1 | +D2 | -D1 | -D2 |

ELECTRONIC DEVICE HAVING AT LEAST ONE CHOLESTERIC LIQUID CRYSTAL LAYER

CROSS-REFERENCE TO RELATED APPLICATIONS

This application claims the benefit of filing date of U.S. Provisional Application Ser. No. 63/598,276 filed on Nov. 13, 2023 under 35 USC § 119(e)(1), and also claims the benefit of the Chinese Patent Application Serial Number 2024108373028, filed on Jun. 26, 2024, the subject matters of which are incorporated herein by reference.

BACKGROUND

Field of the Disclosure

The present disclosure relates to an electronic device and, more particularly, to a driving method of an electronic device equipped with cholesteric liquid crystal.

Description of Related Art

Cholesterol liquid crystal has been widely used in electronic devices. Its bi-stable characteristics have the advantage of low power consumption, and thus the cholesterol liquid crystal is often used in e-books and electronic paper applications. However, currently, there are still many techniques to be improved in driving the cholesterol liquid crystal. Therefore, the present disclosure provides a driving method that reduces energy consumption and extends the driving circuit.

SUMMARY

The present disclosure provides an electronic device, which comprises: a first panel including a plurality of first electrodes; a plurality of second electrodes intersecting with the plurality of first electrodes to define a plurality of pixels; and a cholesteric liquid crystal layer disposed between the plurality of first electrodes and the plurality of second electrodes, wherein the plurality of pixels each operate through a plurality of phases, the plurality of phases include a preparation phase, a selection phase and an evolution phase, and the preparation phase, the selection phase and the evolution phase each include a high wave phase, a low wave phase, or a high wave phase and a low wave phase, and wherein, when one of the plurality of pixels operates in the low wave phase of the selection phase, a first voltage waveform is applied to one of the plurality of first electrodes corresponding to the one of the plurality of pixels, a second voltage waveform is applied to one of the plurality of second electrodes corresponding to the one of the plurality of pixels, so that the cholesteric liquid crystal layer corresponding to the one of the plurality of pixels receives a first voltage difference, and the first voltage difference is not equal to zero.

Other novel features of the disclosure will become more apparent from the following detailed description when taken in conjunction with the accompanying drawings.

BRIEF DESCRIPTION OF DRAWINGS

FIG. 8A is a schematic diagram of various configurations of the first voltage waveform and the second voltage waveform in the selection phase according to an embodiment of the present disclosure;

FIG. 8B is a schematic diagram of various configurations of the first voltage waveform and the second voltage waveform in the preparation phase according to an embodiment of the present disclosure;

FIG. 8C is a schematic diagram of various configurations of the first voltage waveform and the second voltage waveform in the evolution phase according to an embodiment of the present disclosure;

FIG. 8D is a schematic diagram of various configurations of the first voltage waveform and the second voltage waveform in the non-addressing phase according to an embodiment of the present disclosure;

DETAILED DESCRIPTION OF EMBODIMENT

Figure 1:
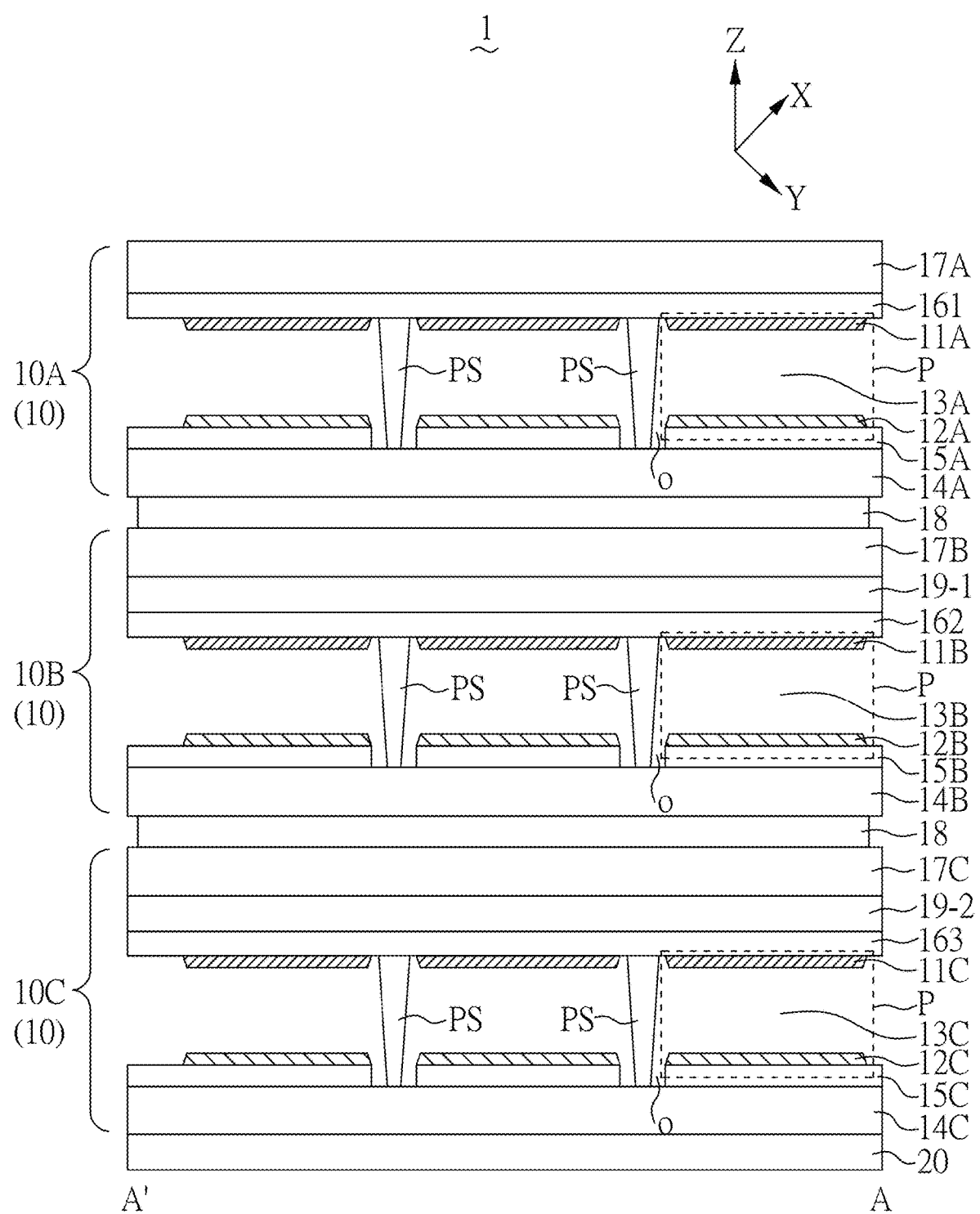
FIG. 1 is a partial structural diagram of an electronic device according to an embodiment of the present disclosure.

Reference will now be made in detail to exemplary embodiments of the present application, examples of which are illustrated in the accompanying drawings. Wherever possible, the same reference numerals are used in the drawings and description to refer to the same or like parts.

The following provides different embodiments of the present disclosure. These embodiments are used to illustrate the technical content of the present disclosure, rather than to limit the claims of the present disclosure. A feature of one embodiment can be applied to other embodiments through suitable modification, substitution, combination, and separation.

It should be noted that, in the specification and claims, unless otherwise specified, having "one" element is not limited to having a single said element, but one or more said elements may be provided. In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. A "first" element and a "second" element may appear together in the same component, or separately in different components. The existence of an element with a larger ordinal number does not necessarily mean the existence of another element with a smaller ordinal number.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "comprising", "containing" and "having" are open-ended words, and should be interpreted as meaning "including but not limited to". Accordingly, when the terms "comprising", "containing" and/or "having" are used in the description of the present disclosure, they specify the presence of the corresponding features, regions, steps, operations and/or components, but do not exclude the presence of one or more corresponding features, regions, steps, operations and/or components.

In the description, the terms "almost", "about", "approximately" or "substantially" usually means within 10%, 5%, 3%, 2%, 1% or 0.5% of a given value or range. The quantity given here is an approximate quantity; that is, without specifying "almost", "about", "approximately" or "substantially", it can still imply the meaning of "almost", "about", "approximately" or "substantially". In addition, the term "range of the first value to the second value" or "range between the first value and the second value" indicates that the range includes the first value, the second value, and other values in between.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way. Unless there is a special definition in the embodiment of the present disclosure.

In addition, relative terms such as "below" or "bottom", and "above" or "top" may be used in the embodiments to describe the relationship between one component and another component in the drawing. It can be understood that, if the device in the drawing is turned upside down, the components described on the "lower" side will become the components on the "upper" side. When the corresponding member (such as a film or region) is described as "on another member", it may be directly on the other member, or there may be other members between the two members. On the other hand, when a member is described as "directly on another member", there is no member between the two members. In addition, when a member is described as "on another member", the two members have a vertical relationship in the top view direction, and this member may be above or below the other member, while the vertical relationship depends on the orientation of the device.

In the present disclosure, the height and distance may be measured using an optical microscope, and the height and distance may be obtained by measuring a cross-sectional image in an electron microscope, but the present disclosure is not limited thereto. In addition, there may be certain errors between any two values or directions used for comparison. If the first value is equal to the second value, it implies that there may be an error of about 10% between the first value and the second value. If the first direction is perpendicular to the second direction, the angle between the first direction and the second direction may be 80 to 100 degrees. If the first direction is parallel to the second direction, the angle between the first direction and the second direction may be 0 to 10 degrees.

It should be noted that the technical solutions provided by the different embodiments described hereinafter may be used interchangeably, combined or mixed to form another embodiment without violating the spirit of the present disclosure.

The electronic device of the present disclosure may include, for example, a display device, a sensing device, an antenna device, a touch device, a tiled device or other suitable electronic devices, but not limited thereto. The display device of the present disclosure may be a non-self-luminous display device or a self-luminous display device, such as a liquid crystal display, a cholesteric liquid crystal display, an electro-phoretic display, an organic light-emitting diode display, a light-emitting diode display, but not limited thereto. The display device may include a light-emitting diode, a light conversion layer or other suitable materials, or a combination thereof, but not limited thereto. The light-emitting diode may include, for example, an organic light-emitting diode (OLED), a sub-millimeter light-emitting diode (mini LED), a micro light-emitting diode (micro LED) or a quantum dot light-emitting diode (quantum dot LED, which may include QLED, QDLED), but not limited thereto. The light conversion layer may include wavelength conversion materials and/or filter materials. The light conversion layer may include, for example, fluorescence, phosphor, quantum dot (QD), other suitable materials or a combination thereof, but not limited thereto. The sensing device may include, for example, a biosensor, a touch sensor, a fingerprint sensor, other suitable sensors, or a combination thereof. The antenna device may be, for example, a liquid crystal antenna or other types of antennas, but not limited thereto. The tiled device may include, for example, a tiled display device or a tiled antenna device, but not limited thereto. The electronic device may include electronic components, and the electronic components may include passive components, active components, or a combination thereof, such as capacitors, resistors, inductors, varactor diodes, variable capacitors, filters, diodes, transistors, sensors, micro-electromechanical system components (MEMS), chips, etc., but not limited thereto. It should be noted that the electronic device of the present disclosure may be various combinations of the above devices, but not limited thereto.

It should be noted that the following embodiments may be replaced, reorganized, and mixed to complete other embodiments without departing from the spirit of the present disclosure. As long as the features of the various embodiments do not violate the spirit of the invention or conflict with each other, they can be mixed and matched arbitrarily.

Unless otherwise defined, all terms (including technical and scientific terms) used herein have the same meaning as commonly understood by one of ordinary skill in the art to which this disclosure belongs. It may be understood that these terms, such as those defined in commonly used dictionaries, should be interpreted as having meanings consistent with the background or context of the related technology and the present disclosure, and should not be interpreted in an idealized or overly formal manner, unless otherwise specified in the embodiments of the present disclosure.

In addition, the term "adjacent" in the specification and claims is used to describe mutual proximity, and does not necessarily mean mutual contact.

In addition, the descriptions such as "when" or "during" in the present disclosure represent aspects such as "now, before or after", and are not limited to situations that occur at the same time, which is described first here. In the present disclosure, similar descriptions such as "arranged on" refer to the corresponding positional relationship between the two components, and do not limit whether there is contact between the two components, unless otherwise specified, which is described here first. Furthermore, when the present disclosure discloses multiple functions, if the word "or" is used between the functions, it means that the functions may exist independently, but it does not exclude that multiple functions may exist simultaneously.

Figures 2, 3:
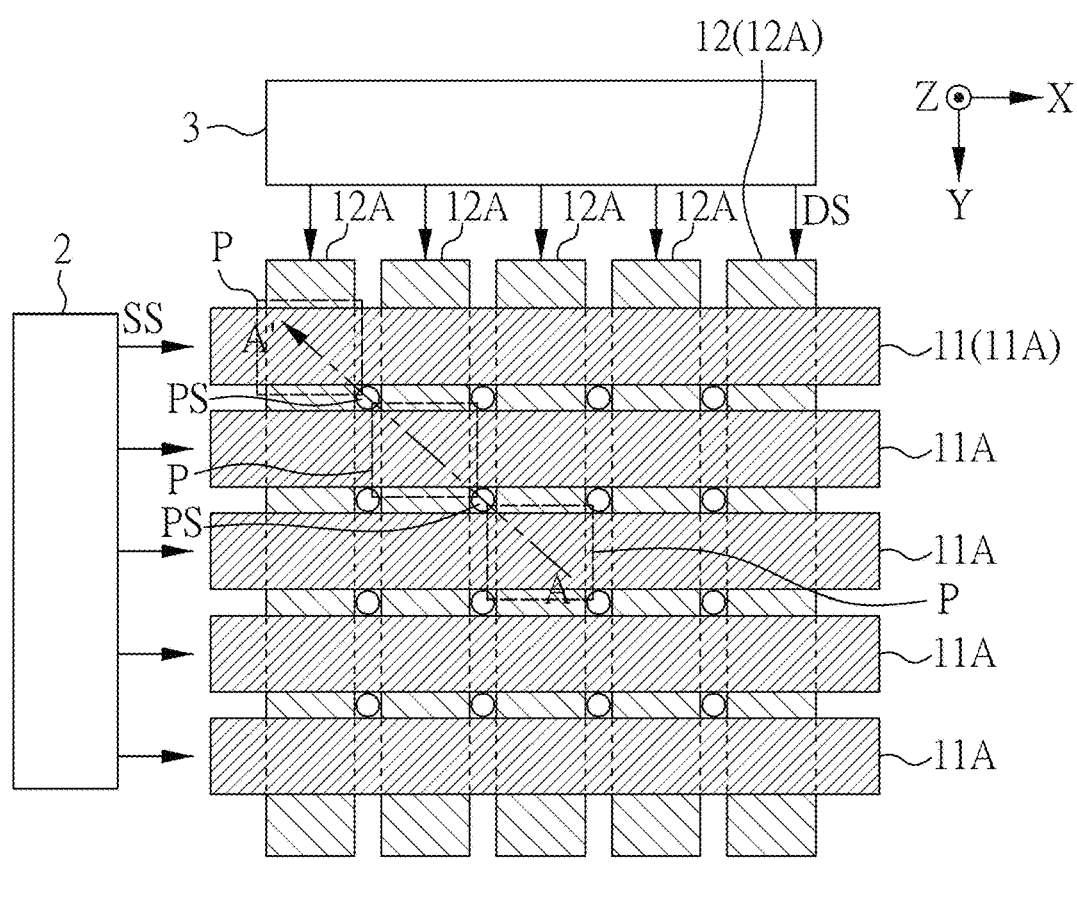
FIG. 2 is a schematic diagram of an electronic device according to an embodiment of the present disclosure.
FIG. 3 is a voltage schematic diagram of the first voltage waveform and the second voltage waveform according to an embodiment of the present disclosure.

Please refer to FIG. 1 and FIG. 2. FIG. 1 is a partial structural diagram of an electronic device 1 according to an embodiment of the present disclosure, and FIG. 2 is a schematic diagram of an electronic device 1 according to an embodiment of the present disclosure, wherein FIG. 1 may correspond to the cross section presented by the cross-section line A-A' in FIG. 2.

The electronic device 1 may include at least one panel 10, a first driving element 2 and a second driving element 3. The at least one panel 10 may include a first panel 10A.

As shown in FIG. 1 and FIG. 2, the first panel 10A may include multiple first electrodes 11, multiple second electrodes 12 and a cholesteric liquid crystal layer 13. The multiple second electrodes 12 intersect with the multiple first electrodes 11 to define multiple pixels P. Specifically, the multiple first electrodes 11 extend along the X direction and are arranged in sequence along the Y direction, the multiple second electrodes 12 extend along the Y direction and are arranged in sequence along the X direction, and the multiple first electrodes 11 and the multiple second electrodes 12 at least partially overlap (for example, intersect) in the Z direction (for example, the top view direction of the electronic device 1), so that the overlapping portions of the multiple second electrodes 12 and the multiple first electrodes 11 may be defined as multiple pixels. In the Z direction, the cholesteric liquid crystal layer 13 may be disposed between the multiple first electrodes 11 and the multiple second electrodes 12. In addition, the adjacent pixels P may be separated by, for example, a spacer PS. Therefore, in the Z direction, the multiple first electrodes 11 and the multiple second electrodes 12 do not overlap the spacer PS, for example, thereby reducing the impact of the spacer PS on the screen display, while it is not limited thereto.

In one embodiment, the first panel 11 may further include a first substrate 17A, a second substrate 14A, an insulating layer 15A, and an insulating layer 161. The first substrate 17A is opposite to the second substrate 14A, and the first cholesteric liquid crystal layer 13A is disposed between the first substrate 17A and the second substrate 14A. The multiple first electrodes 11A may be disposed between the first substrate 17A and the first cholesteric liquid crystal layer 13A. The multiple second electrodes 12 may be disposed between the second substrate 14A and the first cholesteric liquid crystal layer 13A. The insulating layer 15 is disposed between the multiple second electrodes 12A and the second substrate 14A, and the insulating layer 15 may have multiple openings O, while it is not limited thereto. The insulating layer 161 is provided between the multiple first electrodes 11A and the first substrate 17A. In one embodiment, the second substrate 14A and the first substrate 17A may include transparent materials. For example, the second substrate 14A and the first substrate 17A may be glass, but it is not limited thereto. In one embodiment, the material of the insulating layer 15A may include an inorganic or organic insulating layer, such as silicon nitride, but it is not limited thereto. In one embodiment, the first electrode 11A and the second electrode 12A may include transparent conductive materials. In one embodiment, the insulating layer 161 may include an inorganic or organic insulating layer, or the insulating layer 161 may selectively include an anti-ultraviolet (anti-UV) structure, while it is not limited thereto. In addition, in one embodiment, the material of the spacer PS may be, for example, various insulating materials (such as photoresist material), while it is not limited thereto.

In one embodiment, the electronic device 1 may further include a second panel 10B and/or a third panel 10C. In the Z direction, the second panel 10B may be disposed on the third panel 10C, and the first panel 10A may be disposed on the second panel 10B; that is, the second panel 10B is disposed between the third panel 10C and the first panel 10A. In one embodiment, an adhesive layer 18 may be disposed between the second panel 10B and the third panel 10C, and another adhesive layer 18 may be disposed between the first panel 10A and the second panel 10B. The material of the adhesive layer 18 may include optical clear adhesive (OCA), but it is not limited thereto. A black layer 20 is disposed on one side of the third panel 10C away from the second panel 10B.

The second panel 10B may further include a first substrate 17B, a second substrate 14B, an insulating layer 15B, and an insulating layer 162. The first substrate 17B is opposite to the second substrate 14B, and the second cholesteric liquid crystal layer 13B is disposed between the first substrate 17B and the second substrate 14B. The multiple first electrodes 11B may be disposed between the first substrate 17B and the second cholesteric liquid crystal layer 13B. The multiple second electrodes 12B may be disposed between the second substrate 14B and the second cholesteric liquid crystal layer 13B. The insulating layer 15B is disposed between the multiple second electrodes 12B and the second substrate 14B, and may have multiple openings O. The insulating layer 162 is disposed between the multiple first electrodes 11B and the first substrate 17B. In one embodiment, the materials of the second substrate 14B and the first substrate 17B may refer to the aforementioned second substrate 14A or the first substrate 17A. In one embodiment, the first electrode 11B and the second electrode 12B may include transparent conductive materials.

The second panel 10B may further include a color filter (CF) layer 19-1, and the color filter layer 19-1 may be disposed between the insulating layer 162 and the first substrate 17B.

The third panel 10C may include a first substrate 17C, a second substrate 14C, an insulating layer 15C, and an insulating layer 163. The first substrate 17C is opposite to the second substrate 14C, and the third cholesteric liquid crystal layer 13C is disposed between the first substrate 17C and the second substrate 14C. The multiple first electrodes 11C may be disposed between the first substrate 17C and the third cholesteric liquid crystal layer 13C. Multiple second electrodes 12C may be disposed between the second substrate 14C and the third cholesteric liquid crystal layer 13C. The insulating layer 15C is disposed between the multiple second electrodes 12C and the second substrate 14C, and has multiple openings O. The insulating layer 163 is disposed between the multiple first electrodes 11C and the first substrate 17C. In one embodiment, the materials of the second substrate 14C and the first substrate 17C may refer to the aforementioned second substrate 14A or the first substrate 17A. In one embodiment, the first electrode 11C and the second electrode 12C may include transparent conductive materials.

The third panel 10C may further include a color filter (CF) layer 19-2, and the color filter layer 19-2 is disposed between the insulating layer 163 and the first substrate 17C. In one embodiment, the first panel 10A, the second panel 10B and the third panel 10C may be used to display light in different wavelength ranges, respectively. In one embodiment, the first cholesteric liquid crystal layer 13A in the first panel 10A may be used to reflect blue light in a planer state, while it is not limited thereto; the second cholesteric liquid crystal layer 13 of the second panel 10B may be used to reflect green light in a planer state, while it is not limited thereto; the third cholesteric liquid crystal layer 13 of the third panel 10C may be used to reflect red light in a planer state, while it is not limited thereto. The reflection wavelength of each of the aforementioned cholesteric liquid crystal layers may be adjusted according to needs. The configuration of light shown on each of the aforementioned panels is only an example but not a limitation. In addition, the color filter layer 19-1 and the color filter layer 19-2 may be used to filter light of different colors. For example, the color filter layer 19-1 may be used to filter yellow light, and the color filter layer 19-2 may be used to filter red light, while it is not limited thereto.

As shown in FIG. 2, the first driving element 2 may be electrically connected to the multiple first electrodes 11A of the first panel 10A, and may apply a first voltage waveform SS to the first electrodes 11A. Similarly (not shown), another first driving element 2 may be electrically connected to the multiple first electrodes 11B of the second panel 10B, and may apply the first voltage waveform SS to the first electrodes 11B. Similarly (not shown), another first driving element 2 may be electrically connected to the multiple first electrodes 11C of the third panel 10C, and may apply the first voltage waveform SS to the first electrodes 11C. In one embodiment, the first driving element 2 may be, for example, a scan driver, but it is not limited thereto. The second driving element 3 may be electrically connected to the multiple second electrodes 12A of the first panel 10A, and may be used to apply a second voltage waveform DS to the second electrodes 12A. Similarly (not shown), another second driving element 3 may be electrically connected to the multiple second electrodes 12B of the second panel 10B, and may be used to apply the second voltage waveform DS to the second electrodes 12B. Similarly (not shown), another second driving element 3 may be electrically connected to the multiple second electrodes 12C of the third panel 10C, and may be used to apply the second voltage waveform DS to the second electrodes 12C. In one embodiment, the second driving element 3 may be, for example, a data driver, but it is not limited thereto. In one embodiment, the first electrodes (11A, 11B and/or 11C) and the second electrodes (12A, 12B and/or 12C) in each panel (the first panel 10A, the second panel 10B and/or the third panel 10C) may receive the first voltage waveform SS and the second voltage waveform DS, respectively, and a first voltage difference $V_{RMS}$ may be formed between the first voltage waveform SS and the second voltage waveform DS to generate an electric field (such as a vertical electric field). At this moment, the cholesteric liquid crystal layer (13A, 13B or 13C) in the pixel P corresponding to the overlap between the first electrode and the second electrode may be adjusted and arranged, for example, under the influence of the electric field. For a pixel P in the first panel 10A, the second panel 10B and/or the third panel 10C, due to the influence of the first voltage difference $V_{RMS}$ between the first voltage waveform SS applied to the corresponding first electrode (11A, 11B or 11C) and the second voltage waveform DS applied to the corresponding second electrode (12A, 12B or 12C), the arrangement state of the liquid crystal molecules in the cholesterol liquid crystal layer 13 in the pixel P will change, thereby adjusting the optical state of the first panel 10A, the second panel 10B or the third panel 10C.

Next, in the present disclosure, a driving method is provided for driving the panel including the cholesteric liquid crystal layer (13A, 13B or 13C). For example, each of the multiple pixels P operates through multiple operation phases. The multiple operation phases may include a preparation phase, a selection phase and an evolution phase, but it is not limited thereto. In one embodiment, when the frame is to be updated, in the preparation phase, for example, the cholesteric liquid crystals of the pixels originally in the bright state (for example, in a reflective state, that is, a planer state) and the dark state (for example, a focal cone state) are switched to a homeotropic state arrangement. Subsequently, in the selection phase, according to the subsequent switching of the pixels to the bright state or the dark state, the pixels are switched to the homeotropic state or the transient planer state in this phase. For example, when the pixel A is subsequently switched to the bright state, in the selection phase, the pixel A will first be switched to a homeotropic state and, for example, when the pixel B is subsequently switched to the dark state, in the selection phase, the pixel B will first be switched to a transient planer state.

Subsequently, in the evolution phase, according to the subsequent switching of the pixels to the bright state or the dark state, the pixels are switched to the homeotropic state or the focal conic state in this phase. For example, when the pixel A is subsequently switched to the bright state, in the evolution phase, the pixel A will first be switched to the homeotropic state first and, for example, when the pixel B is subsequently switched to the dark state, in the evolution phase, the pixel B will first be switched to the focal conic state.

Subsequently, after the voltage is discharged, the cholesteric liquid crystal in the pixel A changes from the homeotropic state to the planar state, while the cholesteric liquid crystal in pixel B remains in the focal conic state. The above description is a brief description of the basic dynamic driving scheme (DDS).

In one embodiment, when one of the multiple pixels P operates in the preparation phase, the selection phase and the evolution phase, the first driving element 2 respectively applies different first voltage waveforms SS to the first electrode (11A, 11B or 11C) corresponding to each pixel P, and applies different second voltage waveform DS to the second electrode (12A, 12B or 12C) corresponding to each pixel P, so as to switch the cholesteric liquid crystal in the corresponding pixel to a proper state.

Next, the first driving method of the present disclosure regarding the pixel P will be described. FIG. 3 is a schematic diagram illustrating the voltages of the first voltage waveform SS and the second voltage waveform DS according to an embodiment of the present disclosure, and please refer to FIG. 1 and FIG. 2 at the same time. For convenience of explanation, FIG. 3 takes the first voltage waveform SS and the second voltage waveform DS received by one pixel P as an example, and those skilled in the art can infer the conditions of other pixels P therefrom.

As shown in FIG. 3, in one embodiment, when a pixel P operates in the preparation phase, the selection phase and the evolution phase, the first driving element 2 may respectively apply different first voltage waveforms SS to the first electrode (11A, 11B or 11C) corresponding to the pixel P, and the first voltage waveform SS applied in each phase may include at least two of a positive voltage of the first scan voltage +S1, a negative voltage of the first scan voltage −S1, a positive voltage of the second scan voltage +S2, a negative voltage of the second scan voltage −S2, a positive voltage of the third scan voltage +S3, a negative voltage of the third scan voltage −S3. In other words, in any phase of the preparation phase, the selection phase and the evolution phase, the first voltage waveform SS may respectively include at least two types of scan voltages, but it is not limited thereto.

In one embodiment, when the pixel P operates in the preparation phase, the selection phase and the evolution phase, the second driving element 3 may respectively apply different second voltage waveforms DS to the second electrode (12A, 12B or 12C) corresponding to the pixel P, and the different second voltage waveform DS applied in each phase may include a positive voltage of the first data voltage +D1, a negative voltage of the first data voltage −D1, a positive voltage of the second data voltage +D2, and a negative voltage of the second data voltage −D2.

In one embodiment, the absolute value S3 of the positive voltage of the third scan voltage +S3 and the negative voltage of the third scan voltage −S3 may be greater than the absolute value S2 of the positive voltage of the second scan voltage +S2 and the negative voltage of the second scan voltage −S2, and the absolute value S2 of the positive voltage of the second scan voltage +S2 and the negative voltage of the second scan voltage −S2 may be greater than the absolute value S1 of the positive voltage of the first scan voltage +S1 and the negative voltage of the first scan voltage −S1 (that is. S3>S2>S1), but it is not limited thereto. In one embodiment, the absolute value D2 of the positive voltage of the second data voltage +D2 and the negative voltage of the second data voltage −D2 may be greater than the absolute value D1 of the positive voltage of the first data voltage +D1 and the negative voltage of the first data voltage −D1 (that is, D2>D1), but it is not limited thereto. In one embodiment, the absolute value D1 of the positive voltage of the first data voltage +D1 and the negative voltage of the first data voltage −D1 is not equal to the absolute value S1 of the positive voltage of the first scan voltage +S1 and the negative voltage of the first scan voltage −S1 (D1≠S1), but it is not limited thereto. In one embodiment, the absolute value D2 of the positive voltage of the second data voltage +D2 and the negative voltage of the second data voltage −D2 is not equal to the absolute value S3 of the positive voltage of the third scan voltage +S3 and the negative voltage of the third scan voltage −S3 (that is, D2≠S3), but it is not limited thereto. In one embodiment, the absolute value S2 of the positive voltage of the second scan voltage +S2 and the negative voltage of the second scan voltage −S2, the absolute value D1 of the positive voltage of the first data voltage +D1 and the negative voltage of the first data voltage −D1, and the absolute value D2 of the positive voltage of the second data voltage +D2 and the negative voltage of the second data voltage −D2 satisfy the following relationship: S2=(D1+D2)/2. In one embodiment, the absolute value S3 of the positive voltage of the third scan voltage +S3 and the negative voltage of the third scan voltage −S3 may be smaller than 40 volts (V) (S3<40V), or smaller than or equal to 35V (S3≤35V), or smaller than or equal to 30V (S3≤30V), while it is not limited thereto. In one embodiment, the absolute value S2 of the positive voltage of the second scan voltage +S2 and the negative voltage of the second scan voltage −S2 may be smaller than 30V (S2<30V), or smaller than or equal to 25V (S2≤25V), or smaller than or equal to 20V (S2≤20V), while it is not limited thereto.

In one embodiment, the absolute value D2 of the positive voltage of the second data voltage +D2 and the negative voltage of the second data voltage −D2 may be smaller than the absolute value of the positive voltage of the third scan voltage +S3 and the negative voltage of the third scan voltage −S3 (D2<S3), while it is not limited thereto this. In one embodiment, the absolute value D1 of the positive voltage of the first data voltage +D1 and the negative voltage of the first data voltage −D1 may be greater than the absolute value S1 of the positive voltage of the first scan voltage +S1 and the negative voltage of the first scan voltage −S1 (D1>S1), while it is not limited thereto. In one embodiment, the absolute value D2 of the positive voltage of the second data voltage +D2 and the negative voltage of the second data voltage −D2 may be smaller than 40V (D2<40V), or smaller than or equal to 35V (D2≤35V), or smaller than or equal to 30V (D2≤30V), while it is not limited thereto. In one embodiment, the absolute value D1 of the positive voltage of the first data voltage +D1 and the negative voltage −D1 of first data voltage −D1 may be smaller than 30V (D1<30V), or smaller than or equal to 25V (D1≤25V), or smaller than or equal to 20V (D1≤20V), while it is not limited thereto.

Since the voltage applied to the pixel P by the first driving element 2 and the second driving element 3 has positive and negative values, compared with the driving method that only applies positive voltage or negative voltage, the present disclosure is able to reduce energy consumption or extend the service life of the component, while it is not limited thereto. In addition, since the voltage applied in the present disclosure has positive and negative voltages, the amplitude of the voltage to be applied is smaller (for example, the voltage to be applied from 0V to 40V may be replaced by applying voltage of −20V to 0V and 0V to +20V). Therefore, compared with the driving method that only applies positive voltage or negative voltage, the number of flowing charges in the present disclosure can be reduced, and the problem of signal cross talk can also be reduced.

In one embodiment, the values of the first data voltage D1 applied to the first panel 10A, the second panel 10B and the third panel 10C by the second driving element 3 at different phases may be the same or different from each other. For example, when the cholesteric liquid crystal layer 13A of the first panel 10A operates in a planar state for reflecting blue light, the cholesteric liquid crystal layer 13B of the second panel 10B operates in a planar state for reflecting green light, and the cholesteric liquid crystal layer 13C of the third panel 10C operates in a planar state for reflecting red light, the absolute value D1 of the positive voltage of the first data voltage applied to the first panel 10A and the negative voltage of the first data voltage may be, for example, greater than the absolute value D1 of the positive voltage of the first data voltage and the negative voltage of the first data voltage applied to the second panel 10B, and the absolute value D1 of the positive voltage of the first data voltage and the negative voltage of the first data voltage applied to the second panel 10B may be, for example, greater than the absolute value D1 of the positive voltage of the first data voltage and the negative voltage of the first data voltage applied to the third panel 10C, that is, D1 (corresponding to the first panel 10A)>D1 (corresponding to the second panel 10B)>D1 (corresponding to the third panel 10C), while it is not limited thereto. In one embodiment, the absolute values D2 of the positive voltage of the second data voltage and the negative voltage of the second data voltage applied by the second driving element 3 to the first panel 10A, the second panel 10B and the third panel 10C may be the same or different from each other. For example, when the cholesteric liquid crystal layer 13A of the first panel 10A operates in a planar state for reflecting blue light, the cholesteric liquid crystal layer 13B of the second panel 10B operates in a planar state for reflecting green light, and the cholesteric liquid crystal layer 13C of the third panel 10C operates in a planar state for reflecting red light, the absolute value D2 of the positive voltage of the second data voltage and the negative voltage of the second data voltage applied to the first panel 10A may be greater than the absolute value D2 of the positive voltage of the second data voltage and the negative voltage of the second data voltage applied to the second panel 10B, and the absolute value D2 of the positive voltage of the second data voltage and the negative voltage of the second data voltage applied to the second panel 10B may be greater than the absolute value D2 of the positive voltage of the second data voltage and the negative voltage of the second data voltage applied to the third panel 10C, that is, D2 (corresponding to the first panel 10A)>D2 (corresponding to the second panel 10B)>D2 (corresponding to the third panel 10C), while it is not limited thereto.

In one embodiment, the values of the third scan voltage S3 applied by the first driving element 2 to the first panel 10A, the second panel 10B and the third panel 10C may be the same or different from each other. For example, when the cholesteric liquid crystal layer 13A of the first panel 10A operates in a planar state for reflecting blue light, the cholesteric liquid crystal layer 13B of the second panel 10B operates in a planar state for reflecting green light, and the cholesteric liquid crystal layer 13C of the third panel 10C operates in a planar state for reflecting red light, the absolute value S3 of the positive voltage of the third scan voltage and the negative voltage of the third scan voltage applied to the second panel 10B may be greater than the absolute value S3 of the positive voltage of the third scan voltage and the negative voltage of the third scan voltage applied to the third panel 10C, or the absolute value S3 of the positive voltage of the third scan voltage and the negative voltage of the third scan voltage applied to the second panel 10B may be greater than the absolute value S3 of the positive voltage of the third scan voltage and the negative voltage of the third scan voltage applied to the first panel 10A, that is, S3 (corresponding to the second panel 10B)>S3 (corresponding to the third panel 10C), or S3 (corresponding to the second panel 10B)>S3 (corresponding to the first panel 10A), while it is not limited thereto.

In addition, in one embodiment, the preparation phase, selection phase and the evolution phase may each include a high wave phase and/or a low wave phase, wherein the high wave phase and the low wave phase respectively correspond to different second voltage waveforms DS; that is, the second driving element 3 will apply the second voltage waveform DS of different waveforms to the second electrode (12A, 12B or 12C) according to whether the current phase is a high wave phase or a low wave phase. The second driving element 3 will select the high wave phase or the low wave phase in different phases (preparation phase, selection phase and evolution phase) according to the subsequent switching of the pixel to the bright state or the dark state. When the pixel is subsequently switched to the bright state, the second driving element 3 selects the high wave phase in different phases (preparation phase, selection phase and evolution phase), and applies the second voltage waveform DS in the high wave phase to the second electrode (12A, 12B or 12C) of the corresponding pixel. When the pixel is subsequently switched to the dark state, the second driving element 3 selects the low wave phase in different phases (preparation phase, selection phase and evolution phase), and applies the second voltage waveform DS in the low wave phase to the second electrode 12 (12A, 12B or 12C) of the corresponding pixel. For convenience of explanation, in the following description, the second voltage waveform DS in the high wave phase is defined as DS_H, and the second voltage waveform DS in the low wave phase is defined as DS_L.

In one embodiment, in the preparation phase, the selection phase and/or the evolution phase, one cycle of the first voltage waveform SS may be divided into multiple sub-periods, and the multiple sub-periods do not overlap with each other and have approximately the same timing length. In one embodiment, one cycle of the first voltage waveform SS may have, for example, four sub-periods (sub-periods Q1~Q4), but it is not limited thereto. For example, the number of sub-periods divided into one cycle may be adjusted according to needs. In one embodiment, the first voltage waveform SS may have the same or different voltages during these sub-periods Q1~Q4. In one embodiment, in the preparation phase, the selection phase and/or the evolution phase, the second voltage waveform DS is divided into multiple sub-periods, and the multiple sub-periods do not overlap with each other and have approximately the same timing length. In one embodiment, one cycle of the second voltage waveform DS may have four sub-periods (sub-periods Q1~Q4), but it is not limited thereto. The number of sub-periods divided into one cycle may be adjusted according to needs. The positive voltage +D1 or negative voltage −D1 of first data voltage corresponds to one of the sub-periods Q1~Q4, and the positive voltage +D2 or negative voltage −D2 of second data voltage corresponds to another one of the sub-periods Q1~Q4, but it is not limited thereto. In one embodiment, the positive voltage of the first data voltage +D1, the negative voltage of the first data voltage −D1, the positive voltage of the second data voltage +D2, and the negative voltage of the second data voltage −D2 may respectively correspond to one of the four sub-periods Q1~Q4, thereby forming the second voltage waveform DS, but it is not limited thereto. It is noted that the sub-periods Q1~Q4 of the first voltage waveform SS may substantially correspond to the sub-periods Q1~Q4 of the second voltage waveform DS. In one embodiment, the operation phase of the pixel P may optionally include a non-addressing phase. Considering that if each pixel P is driven in a passive manner, in the non-addressing phase, the cholesteric liquid crystal layer 13 of each pixel P may be, for example, applied with a small electric field (for example, smaller than the electric field applied to at least one of the other phases, but it is not limited thereto), thereby maintaining the state of the liquid crystal molecules (for example, bright state or dark state), while it is not limited thereto.

In one embodiment, the voltages of the first voltage waveform SS and the second voltage waveform DS in the preparation phase, the selection phase and the evolution phase may be presented in the following table (Table 1).

TABLE 1

| phase | SS(V) | | | | DS_L(V) | | | | | DS_H(V) | | | | |
|---|---|---|---|---|---|---|---|---|---|---|---|---|---|---|
| | Q1 | Q2 | Q3 | Q4 | Q1 | Q2 | Q3 | Q4 | $V_{RMS}$ | Q1 | Q2 | Q3 | Q4 | $V_{RMS}$ |
| preparation | −S3 | −S3 | S3 | S3 | +D1 | +D2 | −D1 | −D2 | Vp | +D2 | +D1 | −D2 | −D1 | Vp |
| selection | S1 | S3 | −S1 | −S3 | +D1 | +D2 | −D1 | −D2 | VL | +D2 | +D1 | −D2 | −D1 | VH |
| evolution | −S1 | −S1 | S1 | S1 | +D1 | +D2 | −D1 | −D2 | VE | +D2 | +D1 | −D2 | −D1 | VE |
| non-addressing | +S2 | +S2 | −S2 | −S2 | +D1 | +D2 | −D1 | −D2 | VN | +D2 | +D1 | −D2 | −D1 | VN |

As shown in Table 1, in one embodiment, in the preparation phase, the selection phase and/or the evolution phase, the first voltage difference $V_{RMS}$ received by the cholesteric liquid crystal layer 13 corresponding to the pixel P may be, for example, the difference between the first voltage waveform SS and the second voltage waveform DS ($V_{RMS}$=SS-DS). For example, the voltage of the first voltage waveform SS in the sub-period Q1 is subtracted from the voltage of the second voltage waveform DS in the sub-period Q1, the voltage of the first voltage waveform SS in the sub-period Q2 is subtracted from the voltage of the second voltage waveform DS in the sub-period Q2, the voltage of the first voltage waveform SS in the sub-period Q3 is subtracted from the voltage of the second voltage waveform DS in the sub-period Q3, the voltage of the first voltage waveform SS in the sub-period Q4 is subtracted from the voltage of the second voltage waveform DS in the sub-period Q4, and then the root mean square calculation is performed on the subtraction results corresponding to each sub-period Q1-Q4, so as to obtain the first voltage difference $V_{RMS}$, while it is not limited thereto.

As shown in Table 1, in one embodiment, when the pixel P operates in the low wave phase of the preparation phase, the first voltage waveform SS includes, for example, the positive voltage of the third scan voltage +S3 and the negative voltage of the third scan voltage −S3, the second voltage waveform DS_L includes the positive voltage of the first data voltage +D1, the negative voltage of the first data voltage −D1, the positive voltage of the second data voltage +D2, and the negative voltage of the second data voltage −D2. At this moment, the first voltage difference $V_{RMS}$ may be VP. In one embodiment, when the pixel P operates in the high wave phase of the preparation phase, the first voltage waveform SS includes the positive voltage of the third scan voltage +S3 and the negative voltage of the third scan voltage −S3, the second voltage waveform DS_H includes the positive voltage of the first data voltage +D1, the negative voltage of the first data voltage −D1, the positive voltage of the second data voltage +D2, and the negative voltage of the second data voltage −D2. At this moment, the first voltage difference $V_{RMS}$ may be VP. In one embodiment, in the low wave phase and the high wave phase of the preparation phase, the waveforms of the first voltage waveform SS may be the same, and the waveforms of the second voltage waveform DS_L and DS_H may be different. In one embodiment, in the low wave phase and the high wave phase of the preparation phase, the first voltage differences $V_{RMS}$ are both VP, wherein VP may be expressed as the following formula:

$$VP = \sqrt{(-S3 - D1)^2 + (-S3 - D2)^2 + (S3 + D1)^2 + (S3 + D2)^2},$$

while it is not limited thereto.

In one embodiment, when the pixel P operates in the low wave phase of the selection phase, the first voltage waveform SS includes the positive voltage of the first scan voltage +S1, the negative voltage of the first scan voltage −S1, the positive voltage of the third scan voltage +S3, and the negative voltage of the third scan voltage +S3, and the second voltage waveform DS_L includes the positive voltage of the first data voltage +D1, the negative voltage of the first data voltage −D1, the positive voltage of the second data voltage +D2, and the negative voltage of the second data voltage −D2, wherein the absolute value D1 of the positive voltage of the first data voltage +D1 and the negative voltage of the first data voltage −D1 is selectively not equal to the absolute value S1 of the positive voltage of the first scan voltage +S1 and the negative voltage of the first scan voltage −S1 (D1≠S1), or the absolute value D2 of the positive voltage of the second data voltage +D2 and the negative voltage of the second data voltage −D2 is not equal to the absolute value S3 of the positive voltage of the third scan voltage +S3 and the negative voltage of the third scan voltage −S3 (D2≠S3). At this moment, the first voltage difference $V_{RMS}$ may be VL. In one embodiment, when the pixel P operates in the high wave phase of the selection phase, the first voltage waveform SS includes the positive voltage of the first scan voltage +S1, the negative voltage of the first scan voltage −S1, the positive voltage of the third scan voltage +S3, and the negative voltage of the third scan voltage −S3, and the second voltage waveform DS_H includes the positive voltage of the first data voltage +D1, the negative voltage of the first data voltage −D1, the positive voltage of the second data voltage +D2, and the negative voltage of the second data voltage −D2. At this moment, the first voltage difference $V_{RMS}$ may be VH. In one embodiment, in the low wave phase and the high wave phase of the selection phase, the waveforms of the first voltage waveform SS may be the same, and the waveforms of the second voltage waveform DS_L and DS_H may be different. In one embodiment, in the low wave phase of the selection phase, the first voltage difference $V_{RMS}$ is VL, wherein VL may be expressed as the following formula, $$VL = \frac{1}{2}\sqrt{(S1 - D1)^2 + (S3 - D2)^2 + (-S1 + D1)^2 + (-S3 + D2)^2},$$

while it is not limited thereto. In one embodiment, in the high wave phase of the selection phase, the first voltage difference $V_{RMS}$ is VH, wherein VH may be expressed as the following formula, $$VH = \frac{1}{2}\sqrt{(S1 - D2)^2 + (S3 - D1)^2 + (-S1 + D2)^2 + (-S3 + D1)^2},$$

while it is not limited thereto.

In one embodiment, when the pixel P operates in the low wave phase of the evolution phase, the first voltage waveform SS includes the positive voltage of the first scan voltage +S1 and the negative voltage of the first scan voltage −S1, and the second voltage waveform DS_L includes the positive voltage of the first data voltage +D1, the negative voltage of the first data voltage −D1, the positive voltage of the second data voltage +D2, and the negative voltage of the second data voltage −D2. At this moment, the first voltage difference $V_{RMS}$ may be VE. In one embodiment, when the pixel P operates in the high wave phase of the evolution phase, the first voltage waveform SS includes the positive voltage of the first scan voltage +S1 and the negative voltage of the first scan voltage −S1, and the second voltage waveform DS_H includes the positive voltage of the first data voltage +D1, the negative voltage of the first data voltage −D1, the positive voltage of the second data voltage +D2, and the negative voltage of the second data voltage −D2. At this moment, the first voltage difference $V_{RMS}$ may be VE. In one embodiment, in the low wave phase and the high wave phase of the evolution phase, the waveforms of the first voltage waveform SS may be the same, and the waveforms of the second voltage waveform DS_L and DS_H may be different. In one embodiment, in the low wave phase and the high wave phase of the evolution phase, the first voltage difference $V_{RMS}$ is VE, wherein VE may be expressed as the following formula, $$VE = \frac{1}{2}\sqrt{(-S1-D1)^2 + (-S1-D2)^2 + (S1+D1)^2 + (S1+D2)^2},$$

while it is not limited thereto.

In one embodiment, when the pixel P operates in the low wave phase of the non-addressing phase, the first voltage waveform SS includes the positive voltage of the second scan voltage +S2 and the negative voltage of the second scan voltage −S2. The second voltage waveform DS_L includes the positive voltage of the first data voltage +D1, the negative voltage of the first data voltage −D1, the positive voltage of the second data voltage +D2, and the negative voltage of the second data voltage −D2. At this moment, the first voltage difference $V_{RMS}$ may be VN. When the pixel P operates in the high wave phase of the non-addressing phase, the first voltage waveform SS includes the positive voltage waveforms of the second voltage waveform DS_L and DS_H may be different. In one embodiment, in the low wave phase and the high wave phase of the non-addressing selection phase, the first voltage difference $V_{RMS}$ is VN, wherein VN may be expressed as the following formula, $$VN = \frac{1}{2}\sqrt{(S2-D1)^2 + (S2-D2)^2 + (-S2+D1)^2 + (-S2+D2)^2},$$

while it is not limited thereto.

In one embodiment, with the design of making the absolute value D1 of the positive voltage of the first data voltage and the negative voltage of the first data voltage not equal to the absolute value S1 of the positive voltage of the first scan voltage and the negative voltage of the first scan voltage (D1≠S1), and/or making the absolute value D2 of the positive voltage of the second data voltage and the negative voltage of the second data voltage not equal to the absolute value D3 of the positive voltage of the third scan voltage and the negative voltage of the third scan voltage (D2≠S3), the first voltage difference $V_{RMS}$ (that is, VL) in the low wave phase of the selection phase may not be zero. Since the driving conditions of different cholesteric liquid crystal materials may be different, the design requirements of some materials may be met by setting that the first voltage difference $V_{RMS}$ (that is, VL) in the low wave phase of the selection phase may not be zero, while it is not limited thereto.

Accordingly, the configuration of the first voltage waveform SS and the second voltage waveform DS can be understood.

Next, an example is given to describe the waveform configuration of the first voltage waveform SS and the second voltage waveform DS of the present disclosure in more detail. In Table 2, actual numerical values are used to present the voltages of the first voltage waveform Scan and the second voltage waveform DS in the preparation phase, the selection phase and evolution phase, wherein the aforementioned S1 is exemplified by 5V, the aforementioned S2 is exemplified by 15V, the aforementioned S3 is exemplified by 25V, the aforementioned D1 is exemplified by 10V, and the aforementioned D2 is exemplified by 20V. Table 2 is presented as follows, but it is not limited thereto.

TABLE 2

| phase | SS(V) | | | | DS_L (V) | | | | | DS_H (V) | | | | |
|---|---|---|---|---|---|---|---|---|---|---|---|---|---|---|
| | Q1 | Q2 | Q3 | Q4 | Q1 | Q2 | Q3 | Q4 | $V_{RMS}$ | Q1 | Q2 | Q3 | Q4 | $V_{RMS}$ |
| preparation | −25 | −25 | +25 | +25 | +10 | +20 | −10 | −20 | 40.31 | +20 | +10 | −20 | −10 | 40.31 |
| selection | +5 | +25 | −5 | −25 | +10 | +20 | −10 | −20 | 5 | +20 | +10 | −20 | −10 | 15 |
| evolution | −5 | −5 | +5 | +5 | +10 | +20 | −10 | −20 | 20.62 | +20 | +10 | −20 | −10 | 20.62 |
| non-addressing | +15 | +15 | −15 | −15 | +10 | +20 | −10 | −20 | 5 | +20 | +10 | −20 | −10 | 5 | of the second scan voltage +S2 and the negative voltage of the second scan voltage −S2, and the second voltage waveform DS_H includes the positive voltage of the first data voltage +D1, the negative voltage of the first data voltage −D1, the positive voltage of the second data voltage +D2, and the negative voltage of the second data voltage −D2. At this moment, the first voltage difference $V_{RMS}$ may be VN. In one embodiment, in the low wave phase and the high wave phase of the non-addressing phase, the waveforms of the first voltage waveform SS may be the same, and the The content of Table 2 may be applicable to the description of Table 1. For example, Table 2 may be regarded as presenting S1-S3 and D1-D2 of Table 1 in numerical form, and thus the detailed description is deemed unnecessary.

Figure 4:
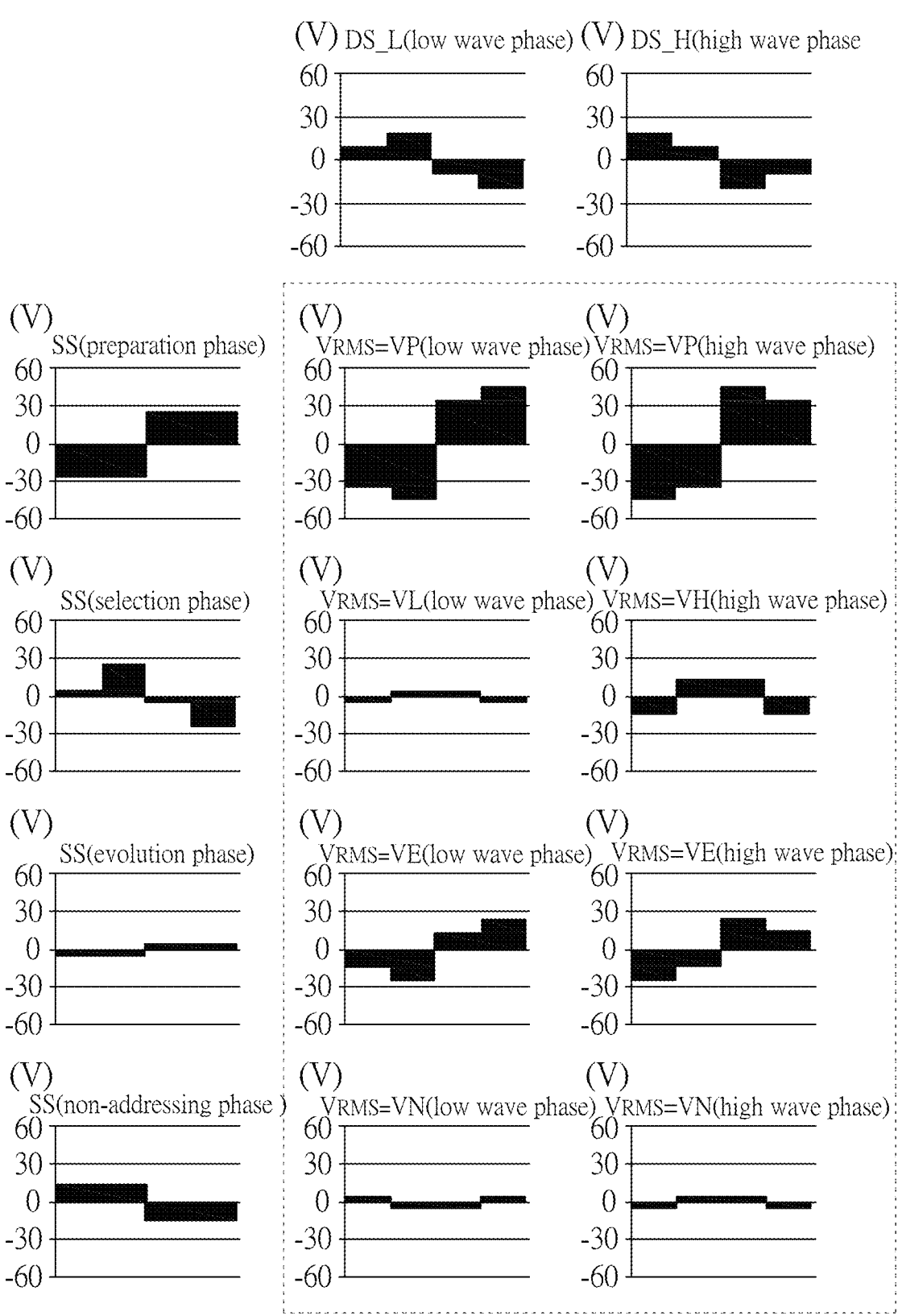
FIG. 4 is a waveform diagram of the first voltage waveform, the second voltage waveform and the first voltage difference in each operation phase according to an embodiment of the present disclosure.

FIG. 4 is a waveform diagram of the first voltage waveform, the second voltage waveform and the first voltage difference in each operation phase according to an embodiment of the present disclosure, and please refer to FIG. 1 to FIG. 3 at the same time, wherein FIG. 4 corresponds to the values in Table 2.

As shown in FIG. 4, in the low wave phase and the high wave phase of the preparation phase, the first voltage differences $V_{RMS}$ may both be 40.31V, but it is not limited thereto. In the low wave phase of the selection phase, the first voltage difference $V_{RMS}$ may be 5V, but it is not limited thereto. In the high wave phase of the selection phase, the first voltage difference $V_{RMS}$ may be 15V, but it is not limited thereto. In the low wave phase and the high wave phase of the evolution phase, the first voltage differences $V_{RMS}$ may both be 15V, but it is not limited thereto. In the low wave phase and the high wave phase of the non-addressing selection phase, the first voltage differences $V_{RMS}$ may both be 5V, but it is not limited thereto.

Next, the driving method of the pixel rows and pixel columns formed by multiple pixels P will be described based on the aforementioned examples of FIG. 3 and FIG. 4.

Figures 5A, 5B:
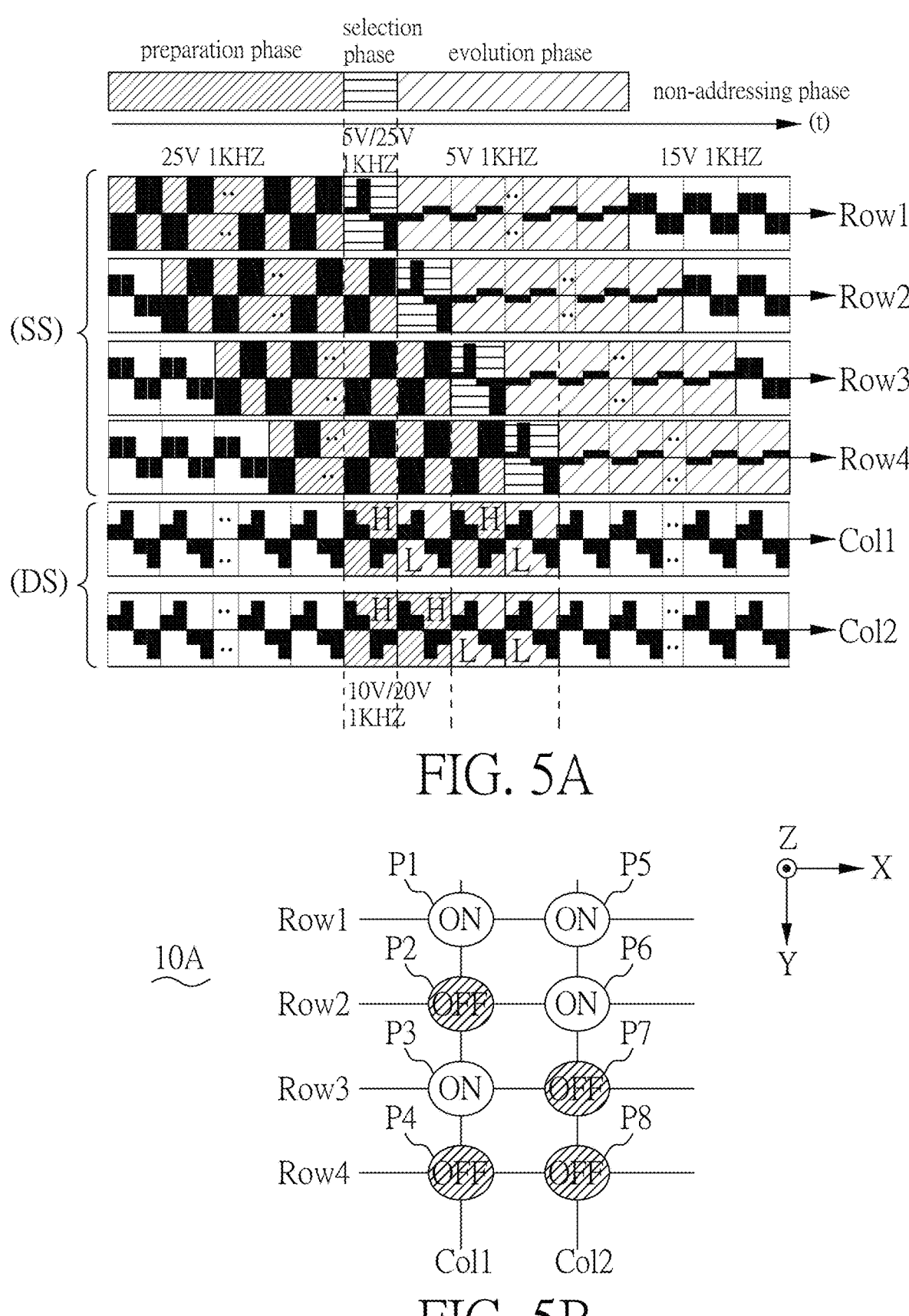
FIG. 5A is a timing diagram of voltage waveforms corresponding to multiple pixel columns and multiple pixel rows according to an embodiment of the present disclosure.
FIG. 5B is a schematic diagram of driving multiple pixels on or off corresponding to FIG. 5A according to an embodiment of the present disclosure.

FIG. 5A is a timing diagram of voltage waveforms corresponding to multiple pixel columns Col1~Col2 and multiple pixel rows Row1~Row4 according to an embodiment of the present disclosure, FIG. 5B is a schematic diagram of driving multiple pixels on or off corresponding to FIG. 5A according to an embodiment of the present disclosure, wherein FIG. 5B is used to show the schematic aspect of multiple pixels P1~P8, for example, after completing the evolution phase and discharging the electric field and in a steady state, and please refer to FIG. 1 to FIG. 4 at the same time. FIG. 5A shows a situation in which the first voltage waveform SS and the second voltage waveform DS in FIG. 4 are applied to the pixel rows Row1~Row4 and the pixel columns Col1~Col2 formed by multiple pixels P.

In addition, each pixel row Row1~Row4 may be electrically connected to, for example, the first driving element 2 (please refer to FIG. 2), and each pixel column Col1~Col2 may be electrically connected to, for example, the second driving element 3 (please refer to FIG. 2).

For the convenience of explanation, in FIG. 5A and FIG. 5B, four pixel rows Row1~Row4 and two pixel columns Col1~Col2 composed of eight pixels P1~P8 are taken as an example. In fact, the quantity of pixels, pixel columns, and pixel rows may be more or less.

As shown in FIG. 5A, the first driving element 2 may, for example, sequentially send the first voltage waveform SS to the pixel rows Row1~Row4, and the second driving element 3 may synchronously send the second voltage waveform DD to the pixel columns Col1 and Col2 according to whether each pixel is in a bright state or a dark state.

In one embodiment, the pixel rows Row1~Row4 are sequentially operated in the preparation phase (thin lines in the figure), the selection phase (horizontal bars in the figure), and the evolution phase (thick lines in the figure), but it is not limited thereto. The timing of the pixel rows Row1~Row4 being respectively operated in the preparation phase may partially overlap. The timing of the pixel rows Row1~Row4 being respectively operated in the selection phase may be successive to each other. The timing of the pixel rows Row1~Row4 being respectively operated in the evolution phase may partially overlap.

In one embodiment, in the preparation phase (thin lines in the figure), the first voltage waveforms SS respectively applied to the pixel rows Row1~Row4 may, for example, have the same waveform, but it is not limited thereto. In the selection phase (horizontal bars in the figure), the first voltage waveforms SS respectively applied to the pixel rows Row1~Row4 may, for example, have the same waveform, but it is not limited thereto. In the evolution phase (thick lines in the figure), the first voltage waveforms SS respectively applied to the pixel rows Row1~Row4 may, for example, have the same waveform, but it is not limited thereto. In different phases (preparation phase, selection phase or evolution phase), the first voltage waveform SS is different, for example.

In one embodiment, the second voltage waveform DS applied to the pixel columns Col1 and Col2 may be selected to be the second voltage waveform of high wave phase DS_H or the second voltage waveform of low wave phase DS_L according to whether the pixel is subsequently switched to a bright state (ON) or a dark state (OFF), while it is not limited thereto.

In one embodiment, the optical state of the pixels P1~P8 in the steady state may be determined by selecting the waveform of the high wave phase D_H or the low wave phase D_L as the applied second voltage waveform DS in the selection phase. As shown in FIG. 5A and FIG. 5B, in one embodiment, the pixel P1 receives the first voltage waveform SS through the pixel row Row1 in the selection phase, and receives the second voltage waveform D_H of the high wave phase through the pixel column Col1. Therefore, the pixel P1 may present a bright state (shown as ON in FIG. 5B) in the steady state. In the selection phase, the pixel P2 receives the first voltage waveform SS through the pixel row Row2, and receives the second voltage waveform D_L in the low wave phase through the pixel column Col1. Therefore, the pixel P2 may present a dark state (shown as OFF in FIG. 5B) in the steady state. In the selection phase, the pixel P3 receives the first voltage waveform SS through the pixel row Row3, and receives the second voltage waveform D_H of the high wave phase through the pixel column Col1. Therefore, the pixel P3 may present a bright state in the steady state. In the selection phase, the pixel P4 receives the first voltage waveform SS through the pixel row Row4, and receives the second voltage waveform D_L of the low wave phase through the pixel column Col1. Therefore, the pixel P4 may present a dark state in the steady state. In the selection phase, the pixel P5 receives the first voltage waveform SS through the pixel row Row1, and receives the second voltage waveform D_H of the high wave phase through the pixel column Col2. Therefore, the pixel P5 may present a bright state in the steady state. In the selection phase, the pixel P6 receives the first voltage waveform SS through the pixel row Row2, and receives the second voltage waveform D_H of the high wave phase through the pixel column Col2. Therefore, the pixel P6 may present a bright state in the steady state. In the selection phase, the pixel P7 receives the first voltage waveform SS through the pixel row Row3, and receives the second voltage waveform D_L of the low wave phase through the pixel column Col2. Therefore, the pixel P7 may present a dark state in the steady state. In the selection phase, the pixel P8 receives the first voltage waveform SS through the pixel row Row4, and receives the second voltage waveform DS_L of the low wave phase through the pixel column Col2. Therefore, the pixel P8 may present a dark state in the steady state. The aforementioned description in which each pixel presents a dark state or a bright state in a steady state is only an example and may be adjusted according to the image conditions to be displayed.

Figure 6A:
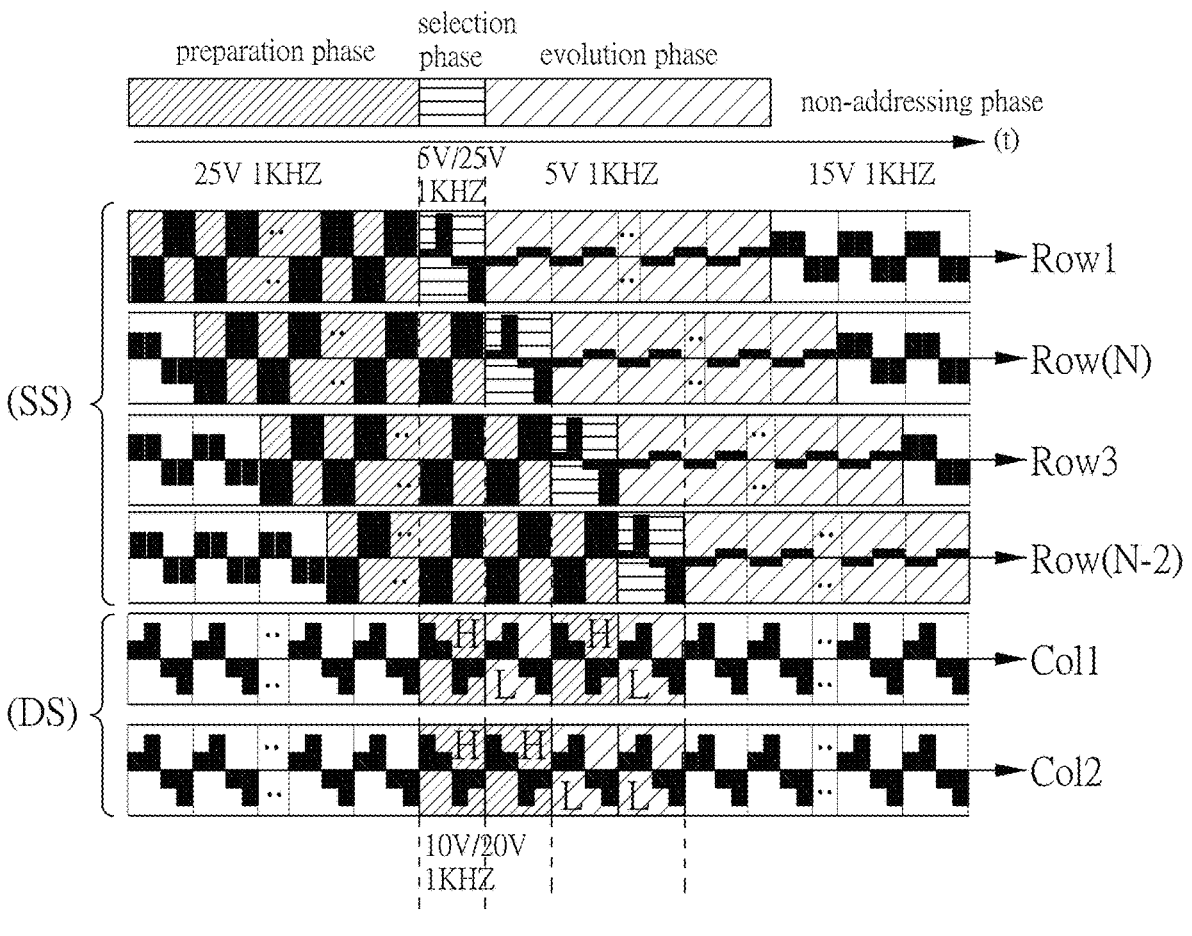
FIG. 6A is a timing diagram of voltage waveforms corresponding to multiple pixel columns and pixel rows according to another embodiment of the present disclosure.
Figure 6B:
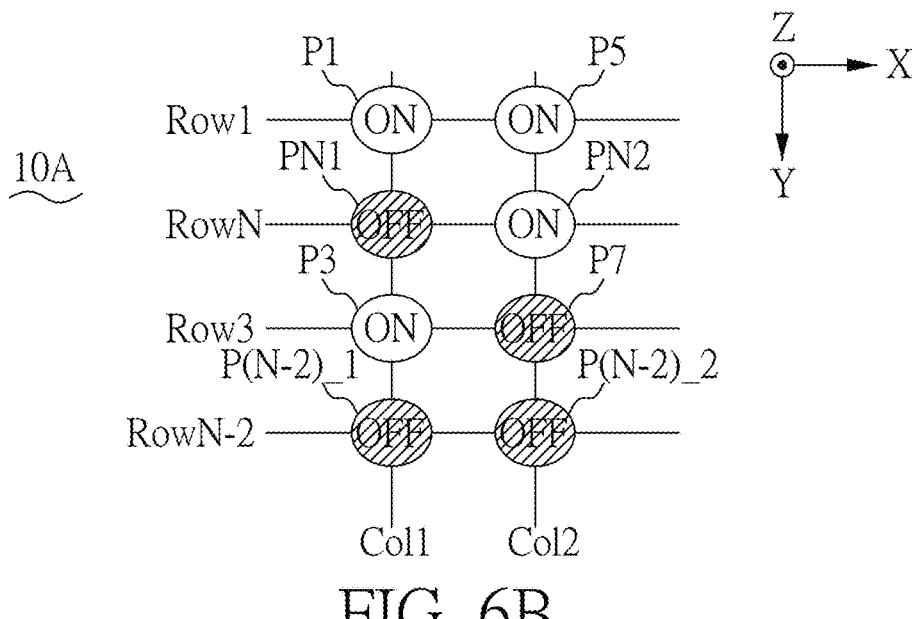
FIG. 6B is a schematic diagram of driving multiple pixels on or off corresponding to FIG. 6A according to another embodiment of the present disclosure.

In addition, the timing of the voltage waveforms corresponding to the pixel columns and pixel rows may also have different implementation aspects. FIG. 6A is a timing diagram of voltage waveforms corresponding to multiple pixel columns Col1~Col2 and multiple pixel rows Row1~RowN according to another embodiment of the present disclosure, FIG. 6B is a schematic diagram of driving multiple pixels on or off corresponding to FIG. 6A according to another embodiment of the present disclosure, wherein FIG. 6B is used to show the schematic aspect of multiple pixels P1~PN2, for example, after completing the evolution phase and discharging the electric field and in a steady state, and please refer to FIG. 1 to FIG. 5B at the same time. In addition, FIG. 6B may present the optical state of the bright state or the dark state of the multiple pixels P1~PN2 in the steady state under the driving shown in FIG. 6A, while it is not limited thereto. The description of the embodiment of FIG. 6A may be applicable to the embodiment of FIG. 5A, and thus only the differences will be described below.

In FIG. 6A, the first panel 10A, the second panel 10B or the third panel 10C may, for example, respectively have N pixel rows Row1~RowN (FIG. 6A only shows Row1, Row3, Row(N−2), Row (N)), and each pixel row Row1~RowN may be electrically connected to the first driving element 2, for example, where N is a positive integer greater than or equal to 4. For convenience of explanation, in FIG. 6A and FIG. 6B, four pixel rows and two pixel columns Col1~Col2 formed by eight pixels P1~P8 are taken as an example. In fact, the quantity of pixels, pixel columns and pixel rows may be more.

As shown in FIG. 6A, the first driving element 2 may asynchronously send the first voltage waveform SS corresponding to different phases to the N pixel rows Row1~RowN, and may send the first voltage waveforms SS corresponding to different phases without being based on the arrangement order (for example, the arrangement order in the Y direction) of the N pixel rows Row1~RowN. For example, the first driving element 2 may first send the first voltage waveform SS to the pixel row Row1, then the first driving element 2 may send the first voltage waveform SS to the pixel row RowN, then the first driving element 2 may send the first voltage waveform SS to the pixel row Row3, and the first driving element 2 may send the first voltage waveform SS to the pixel row Row(N−2), while it is not limited thereto.

As shown in FIG. 6A and FIG. 6B, in one embodiment, in the selection phase, the pixel P1 receives the first voltage waveform SS through the pixel row Row1, and receives the second voltage waveform DS_H of the high wave phase through the pixel column Col1. Therefore, the pixel P1 may present a bright state in a steady state. In the selection phase, Therefore, the pixel P(N−2)_1 may present a dark state in the steady state. In the selection phase, the pixel P5 receives the first voltage waveform SS through the pixel row Row1, and receives the second voltage waveform DS_H of the high wave phase through the pixel column Col2. Therefore, the pixel P5 may present a bright state in the steady state. In the selection phase, the pixel PN2 receives the first voltage waveform SS through the pixel row RowN, and receives the second voltage waveform DS_H of the high wave phase through the pixel column Col2. Therefore, the pixel PN2 may present a bright state in the steady state. In the selection phase, the pixel P7 receives the first voltage waveform SS through the pixel row Row3, and receives the second voltage waveform DS_L of the low wave phase through the pixel column Col2. Therefore, the pixel P7 may present a dark state in the steady state. In the selection phase, the pixel P(N−2)_2 receives the first voltage waveform SS through the pixel row Row(N−2), and receives the second voltage waveform DS_L of the low wave phase through the pixel column Col2. Therefore, the pixel P(N−2)_2 may present a dark state in the steady state.

Accordingly, the timing of the voltage waveforms corresponding to the multiple pixel columns and the multiple pixel rows of the first panel 10A, the second panel 10B or the third panel 10C, and the optical state in the steady state can be understood.

Figure 7:
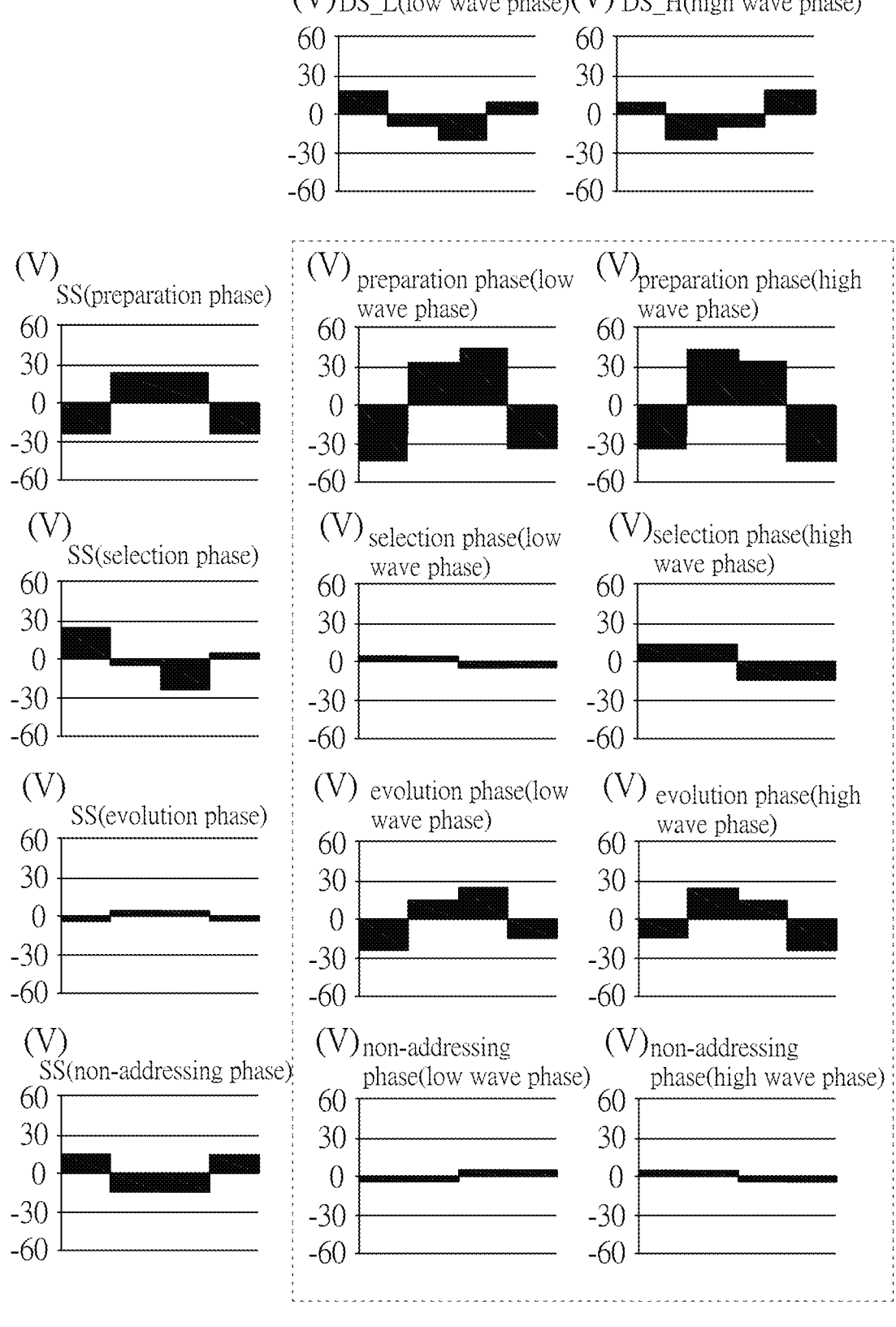
FIG. 7 is a waveform diagram of the first voltage waveform, the second voltage waveform and the first voltage difference in each operation phase according to another embodiment of the present disclosure.

The waveform configurations of the first voltage waveform SS and the second voltage waveform DS of the present disclosure may also have different aspects. Compared with the aspects of FIG. 3, FIG. 4, Table 1 and Table 2, in Table 3, actual numerical values are used to present the voltages of the first voltage waveform SS and the second voltage waveform DS in another aspect in the preparation phase, selection phase and evolution phase. Furthermore, FIG. 7 is a waveform diagram of the first voltage waveform SS, the second voltage waveform DS and the first voltage difference $V_{RMS}$ in each operation phase according to another embodiment of the present disclosure, wherein FIG. 7 corresponds to the values in Table 3 and, in Table 3, S1 is exemplified by 5V, S2 is exemplified by 15V, S3 is exemplified by 25V, D1 is exemplified by 10V, and D2 is exemplified by 20V. Table 3 is presented as follows.

TABLE 3

| phase | SS (V) | | | | DS_L (V) | | | | | DS_H (V) | | | | |
|---|---|---|---|---|---|---|---|---|---|---|---|---|---|---|
| | Q1 | Q2 | Q3 | Q4 | Q1 | Q2 | Q3 | Q4 | $V_{RMS}$ | Q1 | Q2 | Q3 | Q4 | $V_{RMS}$ |
| preparation | −25 | +25 | +25 | −25 | +20 | −10 | −20 | +10 | 40.31 | +10 | −20 | −10 | +20 | 40.31 |
| selection | +25 | −5 | −25 | +5 | +20 | −10 | −20 | +10 | 5 | +10 | −20 | −10 | +20 | 15 |
| evolution | −5 | +5 | +5 | −5 | +20 | −10 | −20 | +10 | 20.62 | +10 | −20 | −10 | +20 | 20.62 |
| non-addressing | +15 | −15 | −15 | +15 | +20 | −10 | −20 | +10 | 5 | +10 | −20 | −10 | +20 | 5 | the pixel PN1 receives the first voltage waveform SS through the pixel row RowN, and receives the second voltage waveform DS_L of the low wave phase through the pixel column Col1. Therefore, the pixel PN1 may present a dark state in the steady state. In the selection phase, the pixel P3 receives the first voltage waveform SS through the pixel row Row3, and receives the second voltage waveform DS_H of the high wave phase through the pixel column Col1. Therefore, the pixel P3 may present a bright state in the steady state. In the selection phase, the pixel P(N−2)_1 receives the first voltage waveform SS through the pixel row Row(N−2), and receives the second voltage waveform DS_L of the low wave phase through the pixel column Col1.

The contents of Table 3 are applicable to the description of Table 2, and the contents of FIG. 7 are applicable to the description of FIG. 4. For example, the voltages of the first voltage waveform SS and/or the second voltage waveform DS in each phase in Table 3 and FIG. 7 may be the same as Table 2 and FIG. 4, but the arrangement order of the voltages of the first voltage waveform SS and/or the second voltage waveform DS in the sub-periods Q1~Q4 of each phase in Table 3 and FIG. 7 may be different from the arrangement order in Table 2 and FIG. 4. In addition, although the arrangement order of the voltages in Table 3 and FIG. 7 is different from Table 2 and FIG. 4, the first voltage difference $V_{RMS}$ of each phase in Table 3 and FIG. 7 is still the same as the first voltage difference $V_{RMS}$ in Table 2 and FIG. 4.

It can be seen that the arrangement order of the voltages of the first voltage waveform SS and/or the second voltage waveform DS of the present disclosure in the sub-periods Q1~Q4 of each phase may be adjusted arbitrarily according to the needs, so as to have high adaptability.

In addition to the aforementioned bright state and dark state, the pixel P of the present disclosure may also be used to present a gray-scale state. FIG. 8A is a schematic diagram of various configurations of the first voltage waveform SS and the second voltage waveform DS in the selection phase according to an embodiment of the present disclosure, which is used to show the schematic diagram of the voltage waveform received by the pixel P when presenting a dark state, a gray-scale state, and a bright state, and please also refer to FIG. 1 to FIG. 7. It is noted that, in FIG. 8A, the numerical values in Table 1 and Table 2 are taken as an example, and please refer to Table 2 for the actual voltage values described below.

As shown in FIG. 8A, in one embodiment, each sub-period Q1~Q4 may be divided into n parts (for example, the length of one sub-period may be n), wherein the n of each sub-period Q1~Q4 may be composed of m1 plus m2 (n=m1+m2), where m1 is, for example, the time length of the second voltage waveform DS_L occupying the low wave phase in the second voltage waveform DS received by the second electrode in each sub-period Q1~Q4, and m2 is, for example, the time length of the second voltage waveform DS_H occupying the high wave phase in the second voltage waveform DS received by the second electrode in each sub-period Q1~Q4. The sizes of m1 and m2 may be adjusted according to the gray-scale level. When the bright state is to be displayed, m1 is equal to, for example, 0, and m2 is equal to n. When the dark state is to be displayed, m1 is equal to, for example, n, and m2 is equal to 0. When the gray-scale state is to be displayed, based on the brightness of the gray-scale, m1 and m2 may be selectively designed as follows: m1<m2 or m1=m2 or m1>m2.

For example, in the selection phase and when the pixel P (shown in FIG. 1 or FIG. 2) is to be driven to present a bright state, the second voltage waveform DS_H of the high wave phase may be selected for the second voltage waveform DS of all parts in each sub-period Q1~Q4, i.e., m2=n. That is, Q1 completely corresponds to +D2, Q2 completely corresponds to +D1, Q3 completely corresponds to −D2, and Q4 completely corresponds to −D1, but it is not limited thereto. In this embodiment, in the sub-period Q1, the voltage of the first voltage waveform SS may be the positive voltage of the first scan voltage +S1 (for example, +5V), and the voltage of the second voltage waveform DS_H may be the positive voltage of the second data voltage +D2 (for example +20V). In the sub-period Q2, the voltage of the first voltage waveform SS may be the positive voltage of the third scan voltage +S3 (for example, +25V), and the voltage of the second voltage waveform DS_H may be the positive voltage of the first data voltage +D1 (for example, +10V). In the sub-period Q3, the voltage of the first voltage waveform SS may be the negative voltage of the first scan voltage −S1 (for example −5V), and the voltage of the second voltage waveform DS_H may be the negative voltage of the second data voltage −D2 (for example −20V). In the sub-period Q4, the voltage of the first voltage waveform SS may be the negative voltage of the third scan voltage −S3 (for example −25V), and the voltage of the second voltage waveform DS_H may be the negative voltage of the first data voltage −D1 (for example −10V). Therefore, the first voltage difference $V_{RMS}$ (that is, VH) received by the cholesteric liquid crystal layer (13A, 13B or 13C) of the pixel P (shown in FIG. 1) may be, for example, 15V, so that the pixel P may present a bright state, but it is not limited thereto.

For example, in the selection phase and when the pixel P is to be driven to present a dark state, the second voltage waveform DS_L of the low wave phase may be selected for the second voltage waveform DS of all parts in each sub-period Q1~Q4, i.e., m1=n. That is, Q1 completely corresponds to +D1, Q2 completely corresponds to +D2, Q3 completely corresponds to −D1, and Q4 completely corresponds to −D2, but it is not limited thereto. In one embodiment, in the sub-period Q1, the voltage of the first voltage waveform SS may be the positive voltage of the first scan voltage +S1 (for example, +5V), and the voltage of the second voltage waveform DS_L may be the positive voltage of the first data voltage +D1 (for example +10V). In the sub-period Q2, the voltage of the first voltage waveform SS may be the positive voltage of the third scan voltage +S3 (for example, +25V), and the voltage of the second voltage waveform DS_L may be the positive voltage of the second data voltage +D2 (for example, +20V). In the sub-period Q3, the voltage of the first voltage waveform SS may be the negative voltage of the first scan voltage −S1 (for example −5V), and the voltage of the second voltage waveform DS_L may be the negative voltage of the first data voltage −D1 (for example −10V). In the sub-period Q4, the voltage of the first voltage waveform Scan may be the negative voltage of the third scan voltage −S3 (for example −25V), and the voltage of the second voltage waveform DS_L may be the negative voltage of the second data voltage −D2 (for example −20V). Therefore, the first voltage difference $V_{RMS}$ (that is, VL) received by the cholesteric liquid crystal layer 13 of the pixel P may be, for example, 5V, so that the pixel P may present a dark state, but it is not limited thereto.

For example, in the selection phase, when driving the pixel P to present a gray-scale state, the second voltage waveform DS may be set that, in each sub-period Q1~Q4, the second electrode may be selected to receive the positive voltage of the first data voltage +D1 (the second voltage waveform DS_L in the low wave phase) during part of the time (for example, m1 time length), and selected to receive the positive voltage of the second data voltage +D2 (the second voltage waveform DS_H of the high wave phase) during part of the time (for example, m2 time length). When presenting the gray-scale state, based on the brightness of the gray-scale, m1 and m2 may be selectively designed as follows: m1<m2 or m1=m2 or m1>m2, but it is not limited thereto.

Figure 8B:
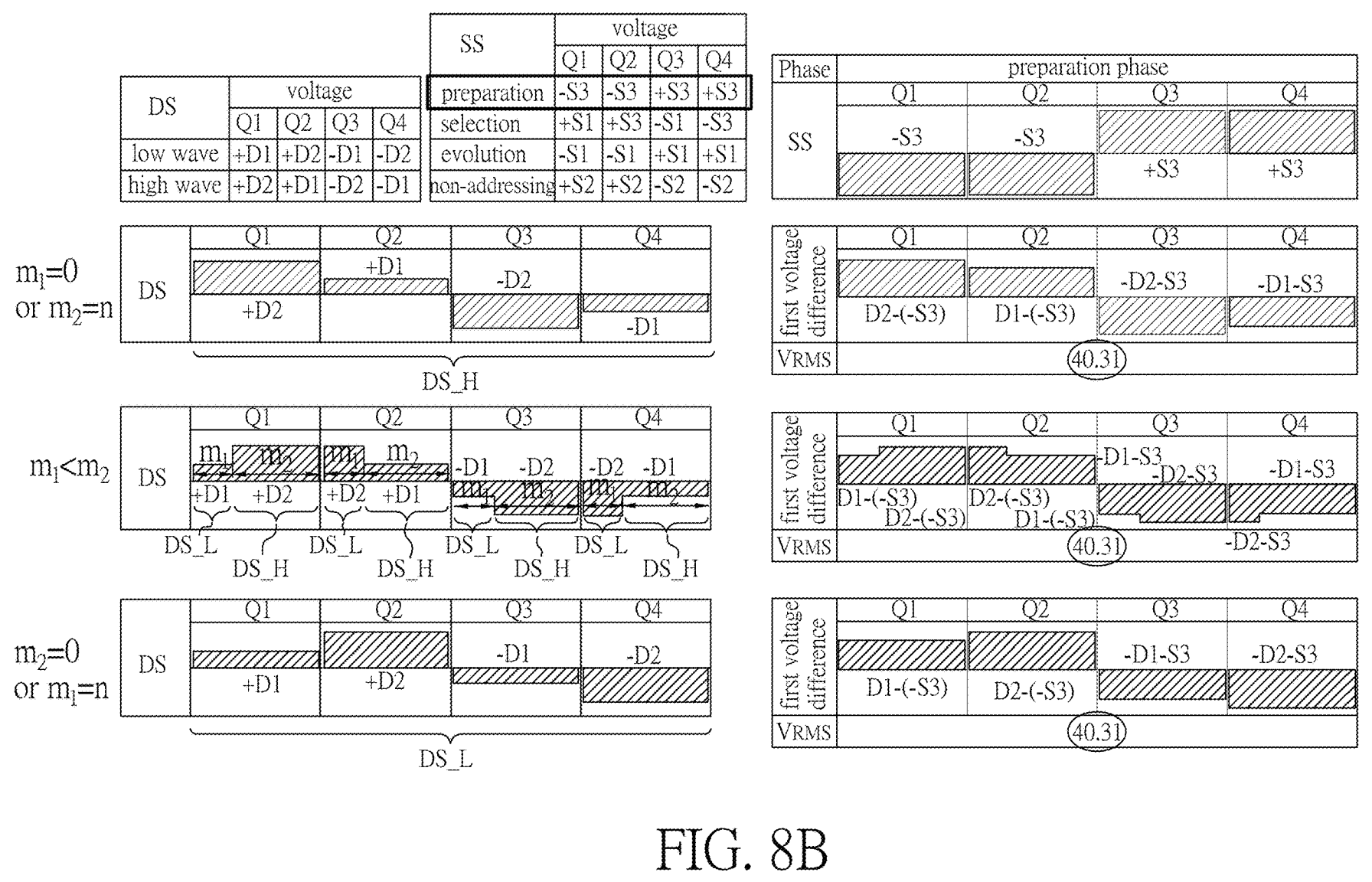
Figure 8C:
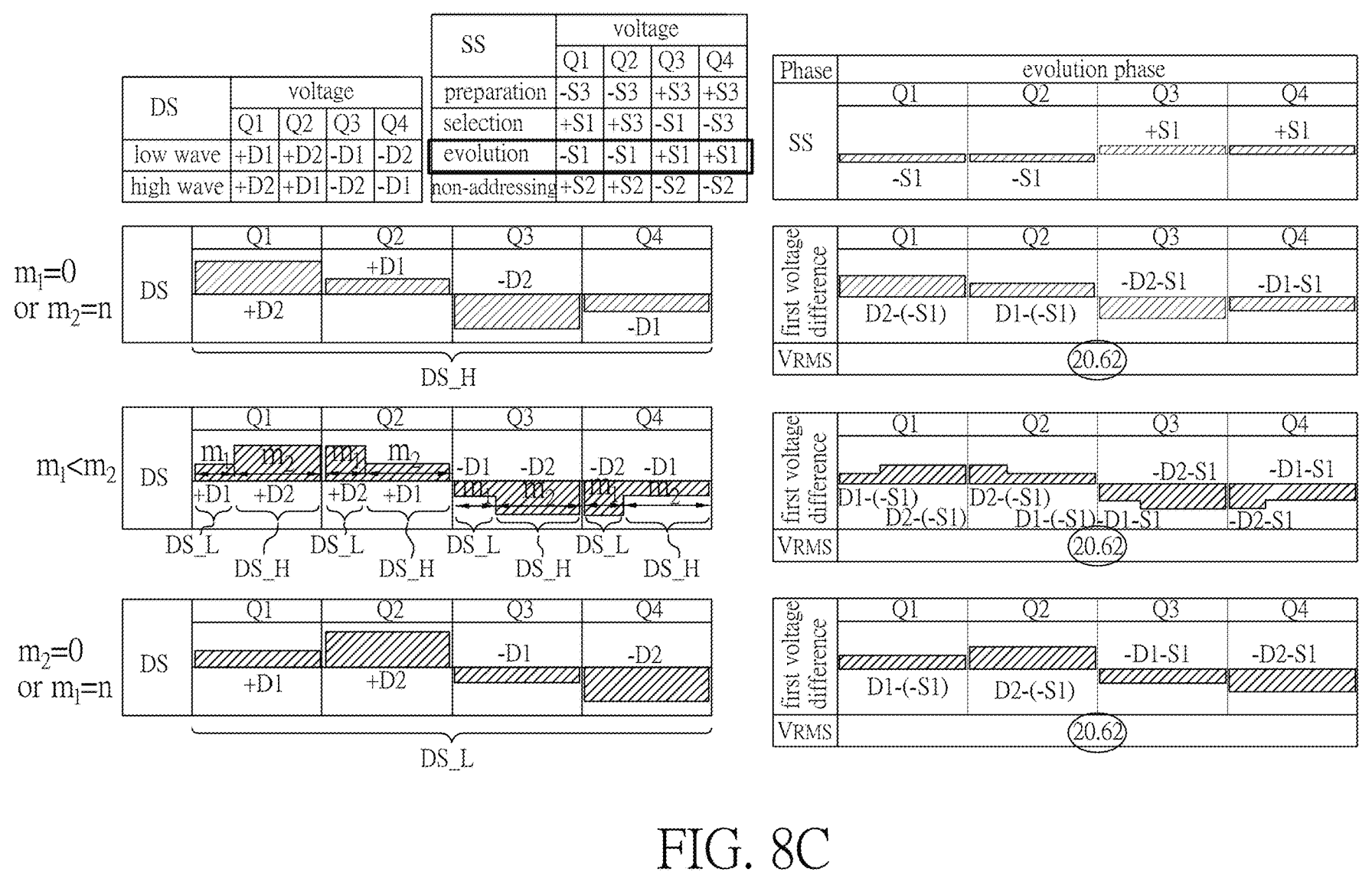

In one embodiment, in the selection phase, in the sub-period Q1, the voltage of the first voltage waveform SS may be the positive voltage of the first scan voltage +S1 (for example, +5V), the voltage of the second voltage waveform DS may be the positive electric voltage of the first data voltage +D1 (for example, +10V) during the period length of m1, and may be the positive voltage of the second data voltage +D2 (for example, +20V) during the period length of m2. In the sub-period Q2, the voltage of the first voltage waveform SS may be the positive voltage of the third scan voltage +S3 (for example, +25V), and the voltage of the second voltage waveform DS may be the positive voltage of the second data voltage +D2 (for example, +20V), and may be the positive voltage of the first data voltage +D1 (for example, +10V) during the period length of m2. In the sub-period Q3, the voltage of the first voltage waveform SS may be the negative voltage of the first scan voltage −S1 (for example −5V), and the voltage of the second voltage waveform DS may receive the negative voltage of the first data voltage −D1 (for example, −10V) during the period of m1 parts, and may be the negative voltage of the second data voltage −D2 (for example −20V). In the sub-period Q4, the voltage of the first voltage waveform SS may be the negative voltage of the third scan voltage −S3 (for example, −25V), and the voltage of the second voltage waveform DS may be the negative voltage of the second data voltage −D2 (for example −20V) during the period length of m1, and may be the negative voltage of the first data voltage −D1 (for example −10V) during the period length of m2, but it is not limited thereto. Therefore, the first voltage difference $V_{RMS}$ received by the cholesteric liquid crystal layer 13 of the pixel P may be, for example, 12.75V, which is between 15V in the bright state and 5V in the dark state, so that the pixel P may present a gray-scale state, but it is not limited thereto. By adjusting the proportional relationship between m1 and m2, the first voltage difference $V_{RMS}$ received by the cholesteric liquid crystal layer 13 of the pixel P in the selection phase can be adjusted. The first voltage difference $V_{RMS}$ may be selectively adjusted to any appropriate voltage difference between 15V and 5V ($5V \leq V_{RMS} \leq 15V$), but it is not limited thereto. Next, the influence of the second voltage waveform DS having different voltage configurations (the configuration in FIG. 8A) during the periods of m1 parts and the periods of m2 parts in the preparation phase, the evolution phase and the non-addressing phase is explained. FIG. 8B is a schematic diagram of various configurations of the first voltage waveform SS and the second voltage waveform DS in the preparation phase according to an embodiment of the present disclosure. FIG. 8C is a schematic diagram of various configurations of the first voltage waveform and the second voltage waveform in the evolution phase according to an embodiment of the present disclosure. FIG. 8D is a schematic diagram of various configurations of the first voltage waveform SS and the second voltage waveform DS in the non-addressing phase according to an embodiment of the present disclosure. Since the second voltage waveform DS follows the configuration in FIG. 8A, a detailed description for this portion is deemed unnecessary.

As shown in FIG. 8B, in the preparation phase, the first voltage waveform SS may be the negative voltage of the third scan voltage −S3 (for example −25V) during the sub-period Q1, the first voltage waveform SS may be the negative voltage of the third scan voltage −S3 (for example, −25V) during the sub-period Q2, the first voltage waveform SS may be the positive voltage of the third scan voltage +S3 (for example, +25V) during the sub-period Q3, and the first voltage waveform SS may be the positive voltage of the third scan voltage +S3 (for example, +25V) during the sub-period Q4. Regardless of whether the second voltage waveform DS is in the high wave phase (DS_H), in the low wave phase (DS_L), or in the state of driving the gray-scale state as shown in FIG. 8A (each sub-period Q1~Q4 has DS_H and DS_L), the first voltage difference $V_{RMS}$ received by the pixel P is of the same value (for example, 40.31V). It can be seen from this that the first voltage difference $V_{RMS}$ in the preparation phase is not affected by the change in the configuration of the second voltage waveform DS.

As shown in FIG. 8C, in the evolution phase, the first voltage waveform SS may be the negative voltage of the first scan voltage −S1 (for example −5V) during the sub-period Q1, the first voltage waveform SS may be the negative voltage of the first scan voltage −S1 (for example, −5V) during the sub-period Q2, the first voltage waveform SS may be the positive voltage of the first scan voltage +S1 (for example, +5V) during the sub-period Q3, and the first voltage waveform SS may be the positive voltage of the first scan voltage +S1 (for example, +5V) during the sub-period Q4. Regardless of whether the second voltage waveform DS is in the high wave phase (DS_H), in the low wave phase (DS_L), or in the state of driving the gray-scale state as shown in FIG. 8A (each sub-period Q1~Q4 has DS_H and DS_L), the first voltage difference $V_{RMS}$ received by the pixel P is of the same value (for example, 20.62V). It can be seen from this that the first voltage difference $V_{RMS}$ in the preparation phase is not affected by the change in the configuration of the second voltage waveform DS.

As shown in FIG. 8D, in the non-addressing phase, the first voltage waveform SS may be the positive voltage of the second scan voltage +S2 (for example, +15V) during the sub-period Q1, the first voltage waveform SS may be the positive voltage of the second scan voltage +S2 (for example, +15V), the first voltage waveform SS may be the negative voltage of the second scan voltage −S2 (for example, −15V) during the sub-period Q3, and the first voltage waveform SS may be the negative voltage of the second scan voltage −S2 (for example −15V) during the period Q4. Regardless of whether the second voltage waveform DS is in the high wave phase (DS_H), in the low wave phase (DS_L), or in the state of driving the gray-scale state as shown in FIG. 8A (each sub-period Q1~Q4 has DS_H and DS_L), the first voltage difference $V_{RMS}$ received by the pixel P is of the same value (for example, 5V, that is, the pixel P may present a dark state). It can be seen from this that the first voltage difference $V_{RMS}$ in the non-addressing phase is not affected by changes in the configuration of the second voltage waveform DS.

It can be seen that, with the present disclosure, the pixel P can be driven to present a dark state, a bright state or a gray-scale state by adjusting the second voltage waveform DS in the selection phase, while the same second voltage waveform may also be used in other operation phases without being affected.

Figure 9:
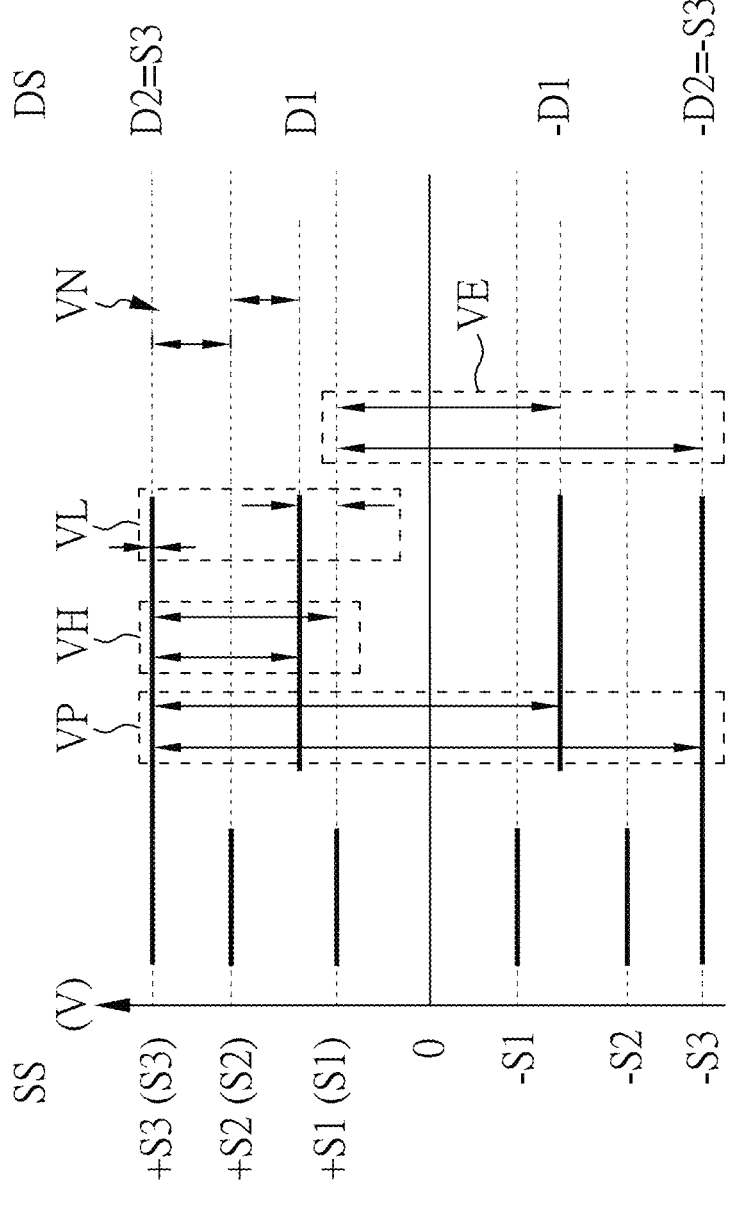
FIG. 9 is a waveform diagram of a first voltage waveform and a second voltage waveform according to another embodiment of the present disclosure.

The first voltage waveform SS and the second voltage waveform DS of the present disclosure may also have different implementation aspects. FIG. 9 is a waveform diagram of the first voltage waveform SS and the second voltage waveform DS according to another embodiment of the present disclosure, and please refer to FIG. 1 to FIG. 8D at the same time. The example in FIG. 9 may be applicable to the description of the example in FIG. 3, and thus only the differences will be described below.

In FIG. 9, the absolute value D2 of the positive voltage and the negative voltage of the second data voltage may be equal to the absolute value S3 of the positive voltage and the negative voltage of the third scan voltage, and may be greater than the absolute value D1 of the positive voltage and the negative voltage of the first data voltage (D2=S3>D1), but it is not limited thereto. In addition, the absolute value S2 of the positive voltage and the negative voltage of the second scan voltage, the absolute value D1 of the positive voltage and the negative voltage of the first data voltage, and the absolute value D2 of the positive voltage and the negative voltage of the second data voltage may still satisfy the following relationship: S2=(D1+D2)/2. The absolute value S3 of the positive voltage and the negative voltage of the third scan voltage may still be greater than the absolute value S2 of the positive voltage and the negative voltage of the second scan voltage, and the absolute value S2 of the positive voltage and the negative voltage of the second scan voltage may still be greater than the absolute value S1 of the positive voltage and the negative voltage of the first scan voltage (S3>S2>S1), but it is not limited thereto. The absolute value D1 of the positive voltage and the negative voltage of the first data voltage and the absolute value S1 of the positive voltage and the negative voltage of the first scan voltage may still not be equal (D1≠S1).

As a result, the types of voltages that need to be provided by the first driving element 2 and the second driving element 3 can be reduced, while it is not limited thereto.

In addition, as the temperature of the environment changes, the viscosity of the cholesteric liquid crystal layer (13A, 13B and/or 13C) may also change, resulting in that the arrangement of the cholesteric liquid crystal molecules is affected by the magnitude of the electric field. For example, cholesteric liquid crystal molecules may be subjected to electric fields with different voltage differences or may be adjusted during the period in which the electric field is applied so as to achieve the optical state at the original temperature. Therefore, in one embodiment, the present disclosure may at least maintain similar brightness or darkness of the cholesteric liquid crystal layer 13 at different temperatures by adjusting the time length of the evolution phase.

Figure 10:
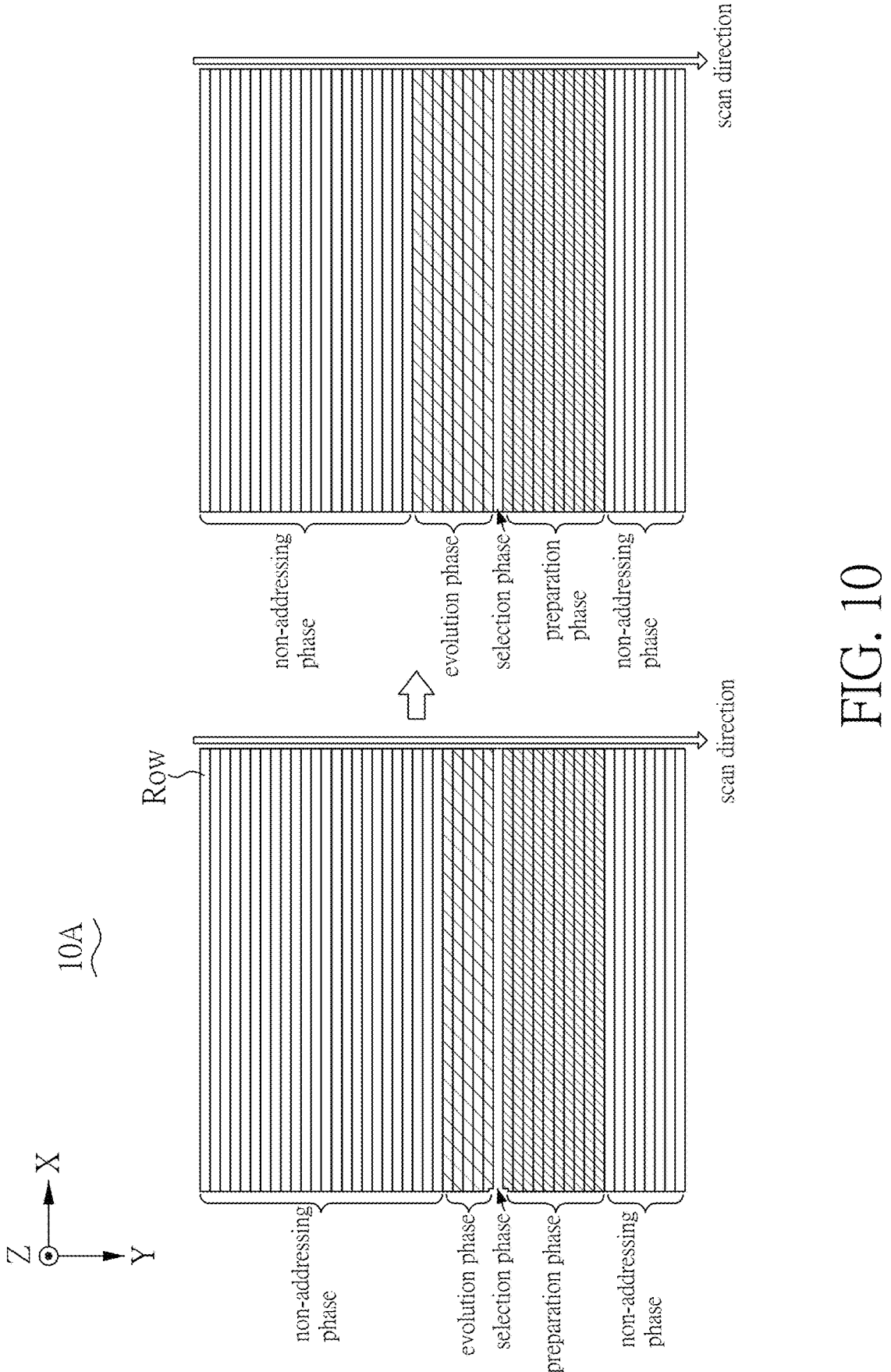
FIG. 10 is a schematic diagram of the operation of multiple pixel rows of the electronic device according to an embodiment of the present disclosure.

FIG. 10 is a schematic diagram of the operation of multiple pixel rows of the electronic device 1 according to an embodiment of the present disclosure, and please refer to FIG. 1 to FIG. 9 at the same time.

In one embodiment, the cholesteric liquid crystal layer 13 may present similar brightness under different ambient temperatures by adjusting the time length of the evolution phase. For example, when the temperature is lower, the time length of the evolution phase may be selectively extended and, when the temperature is higher, the time length of the evolution phase may be selectively shortened, while it is not limited thereto. In one embodiment, the extension of the time length of the evolution phase may be achieved by increasing the number of pixel rows that are simultaneously operated in the evolution phase, but it is not limited thereto.

In addition, in one embodiment, the first voltage difference VE in the evolution phase may be adjusted at various temperatures, so that the cholesteric liquid crystal layer 13 may present the same brightness at different temperatures. For example, when the temperature is lower, the first voltage difference VE may be selectively increased and, when the temperature is higher, the first voltage difference VE may be selectively reduced, while it is not limited thereto. As a result, the electronic device 1 of the present disclosure may adapt to a variety of ambient temperatures, while it is not limited thereto.

In one embodiment, the present disclosure may at least determine whether the product in contention falls within the protection scope of the present disclosure based on the presence or absence of components, component configuration, mechanical observation and/or operation mode of the product in contention, while it is not limited thereto.

The details or features of the various embodiments of the present disclosure may be mixed and matched as long as they do not violate or conflict the spirit of the disclosure.

Accordingly, the driving process of the electronic device of the present disclosure may reduce the driving time, achieve rapid screen change, reduce the problem of signal crosstalk, extend the service life of the components, or be adapted to a variety of ambient temperatures.

The aforementioned specific embodiments should be construed as merely illustrative, and not limiting the rest of the present disclosure in any way.

The invention claimed is:

1. An electronic device, comprising:
   a first panel, including:
   a plurality of first electrodes;
   a plurality of second electrodes intersecting with the plurality of first electrodes to define a plurality of pixels;
   a cholesteric liquid crystal layer disposed between the plurality of first electrodes and the plurality of second electrodes;
   a first driving element electrically connected to the plurality of first electrodes; and
   a second driving element electrically connected to the plurality of second electrodes,
   wherein the plurality of pixels each operate through a plurality of phases, the plurality of phases include a preparation phase, a selection phase and an evolution phase, and the preparation phase, the selection phase and the evolution phase each include a high wave phase, a low wave phase, or a high wave phase and a low wave phase,
   wherein, when one of the plurality of pixels operates in the low wave phase of the selection phase, a first voltage waveform is applied to one of the plurality of first electrodes corresponding to the one of the plurality of pixels, a second voltage waveform is applied to one of the plurality of second electrodes corresponding to the one of the plurality of pixels, so that the cholesteric liquid crystal layer corresponding to the one of the plurality of pixels receives a first voltage difference, and the first voltage difference is not equal to zero,
   wherein, when the one of the plurality of pixels operates in the preparation phase, the selection phase and the evolution phase, the first driving element respectively applies different first voltage waveforms to the one of the plurality of first electrodes, and the different first voltages waveforms include at least two of a positive voltage of a first scan voltage, a negative voltage of the first scan voltage, a positive voltage of a second scan voltage, a negative voltage of the second scan voltage, a positive voltage of a third scan voltage, and a negative voltage of the third scan voltage, wherein an absolute value of the positive voltage of the third scan voltage and the negative voltage of the third scan voltage is greater than an absolute value of the positive voltage of the second scan voltage and the negative voltage of the second scan voltage, and an absolute value of the positive voltage of the second scan voltage and the negative voltage of the second scan voltage is greater than an absolute value of the positive voltage of the first scan voltage and the negative voltage of the first scan voltage,
   wherein, when the one of the plurality of pixels operates in the preparation phase, the selection phase and the evolution phase, the second driving element respectively applies different second voltage waveforms to the one of the plurality of second electrodes, the different second voltage waveforms include at least two of a positive voltage of a first data voltage, a negative voltage of the first data voltage, a positive voltage of a second data voltage, and a negative voltage of the second data voltage, and an absolute value of the positive voltage of the second data voltage and the negative voltage of the second data voltage is greater than an absolute value of the positive voltage of the first data voltage and the negative voltage of the first data voltage.

2. The electronic device as claimed in claim 1, wherein the absolute value of the positive voltage of the first data voltage and the negative voltage of the first data voltage is not equal to the absolute value of the positive voltage of the first scan voltage and the negative voltage of the first scan voltage.

3. The electronic device as claimed in claim 1, wherein the absolute value of the positive voltage of the second data voltage and the negative voltage of the second data voltage is not equal to the absolute value of the positive voltage of the third scan voltage and the negative voltage of the third scan voltage.

4. The electronic device as claimed claim 1, wherein the absolute value of the positive voltage of the second scan voltage and the negative voltage of the second scan voltage, the absolute value of the positive voltage of the first data voltage and the negative voltage of the first data voltage, and the absolute value of the positive voltage of the second data voltage and the negative voltage of the second data voltage satisfy a relationship: $S2=(D1+D2)/2$, where S2 represents the absolute value of the positive voltage of the second scan voltage and the negative voltage of the second scan voltage, D1 represents the absolute value of the positive voltage of the first data voltage and the negative voltage of the first data voltage, and D2 represents the absolute value of the positive voltage of the second data voltage and the negative voltage of the second data voltage.

5. The electronic device as claimed in claim 1, wherein the absolute value of the positive voltage of the third scan voltage and the negative voltage of the third scan voltage is smaller than 40 volts, and the absolute value of the positive voltage of the second scan voltage and the negative voltage of the second scan voltage is smaller than 30 volts.

6. The electronic device as claimed in claim 5, wherein the absolute value of the positive voltage of the third scan voltage and the negative voltage of the third scan voltage is smaller than 30 volts, and the absolute value of the positive voltage of the second scan voltage and the negative voltage of the second scan voltage is smaller than 20 volts.

7. The electronic device as claimed in claim 1, wherein the absolute value of the positive voltage of the second data voltage and the negative voltage of the second data voltage is smaller than 40 volts, and the absolute value of the positive voltage of the first data voltage and the negative voltage of the first data voltage is smaller than 30 volts.

8. The electronic device as claimed in claim 7, wherein the absolute value of the positive voltage of the second data voltage and the negative voltage of the second data voltage is smaller than 30 volts, and the absolute value of the positive voltage of the first data voltage and the negative voltage of the first data voltage is smaller than 20 volts.

9. The electronic device as claimed in claim 1, wherein, when the one of the plurality of pixels operates in the low wave phase of the selection phase, the first voltage waveform includes at least two of the positive voltage of the first scan voltage, the negative voltage of the first scan voltage, the positive voltage of the third scan voltage, and the negative voltage of the third scan voltage, and the second voltage waveform includes at least two of the positive voltage of the first data voltage, the negative voltage of the first data voltage, the positive voltage of the second data voltage, and the negative voltage of the second data voltage, wherein the absolute value of the positive voltage of the first data voltage and the negative voltage of the first data voltage is not equal to the absolute value of the positive voltage of the first scan voltage and the negative voltage of the first scan voltage, or the absolute value of the positive voltage of the second data voltage and the negative voltage of the second data voltage is not equal to the absolute value of the positive voltage of the third scan voltage and the negative voltage of the third scan voltage.

10. The electronic device as claimed in claim 1, further comprising a second panel including a plurality of first electrodes, a plurality of second electrodes and a second cholesteric liquid crystal layer, wherein the plurality of second electrodes of the second panel intersect with the plurality of first electrodes of the second panel to define a plurality of pixels, the second cholesteric liquid crystal layer is disposed between the plurality of second electrodes of the second panel and the plurality of first electrodes of the second panel, and the first panel is disposed on the second panel.

11. The electronic device of claim 10, wherein the second panel further includes an insulating layer and a color filter layer, the insulating layer is disposed between the first electrode of the second panel and first panel, and the color filter layer is disposed between the insulating layer and the first panel.

12. The electronic device as claimed in claim 11, further comprising a third panel including a plurality of first electrodes, a plurality of second electrodes and a third cholesteric liquid crystal layer, wherein the plurality of second electrodes of the third panel intersect with the plurality of first electrodes of the third panel to define a plurality of pixels, the third cholesteric liquid crystal layer is disposed between the plurality of second electrodes of the third panel and the plurality of first electrodes of the third panel, and the second panel is disposed on the third panel.

13. The electronic device as claimed in claim 12, wherein the third panel further includes an insulating layer and a color filter layer, the insulating layer of the third panel is disposed between the first electrode of the third panel and the second panel, the color filter layer of the third panel is disposed between the insulating layer of the third panel and the second panel.

14. The electronic device as claimed in claim 13, wherein the first panel, the second panel and the third panel are respectively used to display light in different wavelength ranges.

15. Electronic device as claimed in claim 13, wherein the color filter layer of the second panel and the color filter layer of the third panel are respectively used to filter light of different colors.

16. The electronic device as claimed in claim 1, wherein the absolute value of the positive voltage and the negative voltage of the second data voltage is equal to the absolute value of the positive voltage and the negative voltage of the third scan voltage, and is greater than the absolute value of the positive voltage and the negative voltage of the first data voltage.

17. The electronic device as claimed in claim 1, wherein the cholesteric liquid crystal layer presents same brightness at different temperatures by adjusting the time length of different evolution phases.

18. The electronic device as claimed in claim 1, wherein the cholesteric liquid crystal layer presents same brightness at different temperatures by receiving the first voltage difference of different evolution phases.

19. The electronic device as claimed in claim 1, wherein, in the selection phase, one cycle of the first voltage waveform includes a plurality of sub-periods, each sub-period having a length including a time length of the second voltage waveform occupying the low wave phase in the second voltage waveform received by the second electrode and a time length of the second voltage waveform occupying the high wave phase in the second voltage waveform received by the second electrode.

* * * * *